(12) United States Patent
Kerwin

(10) Patent No.: US 6,898,609 B2
(45) Date of Patent: May 24, 2005

(54) DATABASE SCATTERING SYSTEM

(76) Inventor: Douglas W. Kerwin, 4 Roosevelt Way, Robbinsville, NJ (US) 08691

(*) Notice: Subject to any disclaimer, the term of this patent is extended or adjusted under 35 U.S.C. 154(b) by 36 days.

(21) Appl. No.: 10/431,898

(22) Filed: May 8, 2003

(65) Prior Publication Data
US 2003/0212660 A1 Nov. 13, 2003

Related U.S. Application Data
(60) Provisional application No. 60/379,370, filed on May 10, 2002.

(51) Int. Cl.[7] .............................................. G06F 17/30
(52) U.S. Cl. .............................. 707/203; 707/8; 707/10; 707/201; 707/202; 707/203; 707/204; 707/205; 707/101
(58) Field of Search .............................. 707/8, 10, 101, 707/200, 201, 202, 203, 204, 205, 3; 709/201, 223; 713/100; 711/162

(56) References Cited

U.S. PATENT DOCUMENTS

| | | | | |
|---|---|---|---|---|
| 5,603,026 A | * | 2/1997 | Demers et al. ................. | 707/8 |
| 5,684,984 A | * | 11/1997 | Jones et al. .................... | 707/10 |
| 5,787,442 A | * | 7/1998 | Hacherl et al. ............. | 707/201 |
| 5,832,225 A | * | 11/1998 | Hacherl et al. ............. | 709/223 |
| 5,838,965 A | * | 11/1998 | Kavanagh et al. ....... | 707/103 R |
| 5,991,766 A | * | 11/1999 | Sadiq et al. ............ | 707/103 R |
| 6,263,433 B1 | * | 7/2001 | Robinson et al. ........... | 713/100 |
| 6,269,432 B1 | * | 7/2001 | Smith ......................... | 711/162 |
| 6,421,688 B1 | * | 7/2002 | Song ........................... | 707/203 |
| 6,523,036 B1 | * | 2/2003 | Hickman et al. ............. | 707/10 |
| 6,751,636 B1 | * | 6/2004 | Mende et al. ................ | 707/200 |
| 6,829,630 B1 | * | 12/2004 | Pajak et al. .................. | 709/201 |
| 2003/0212697 A1 | * | 11/2003 | Davis et al. ................. | 707/101 |

FOREIGN PATENT DOCUMENTS

| | | | |
|---|---|---|---|
| EP | 0992909 A2 | * | 4/2000 |
| WO | WO 99/45465 | * | 9/1999 |

OTHER PUBLICATIONS

Aronoff et al., "System and Method for Reconciling Transactions between a Replication System and a Recovered Database", US Patent Application Publication, Apr. 2002, pp. 1–15.*

Pillai et al., "Information Replication System Mounting Partial Database Replications", US Patent Application Publication, Apr. 2002, pp. 1–28.*

* cited by examiner

*Primary Examiner*—Thuy N. Pardo
(74) *Attorney, Agent, or Firm*—Stoneman Law Offices, Ltd.; Martin L. Stoneman; Benjamin K. Erlick

(57) ABSTRACT

A computer system for providing load balancing and scalable access to a network database system by providing multiple database instances with each instance being substantially identical in data content, database structure, and primary key system. Requests from users are received by the system, examined to determine their nature as transactional or non-transactional and, in the case of non-transactional queries, scattered among the multiple database instances. Such scattering of queries permits multiple instances of the database to be serving responses to multiple users at substantially the same time. In the case of transactional queries, the system automatically propagates the transactional query to all instances of the database to maintain homogeneity.

20 Claims, 9 Drawing Sheets

US 6,898,609 B2

DATABASE SCATTERING SYSTEM

CROSS-REFERENCE TO RELATED APPLICATIONS

The present application is related to applicant's prior U.S. Provisional Application No. 60/379,370, filed May 10, 2002, entitled "Database Scattering System", the contents of which are hereby herein incorporated by reference and are not admitted to be prior art with respect to the present invention by their mention in this cross-reference section.

BACKGROUND

The present invention relates to a method and system for increasing scalability and reliability of database applications, and, more particularly, the use of a scattering method and system to reduce system load and improve response performance. In the modem business environment, reliance upon computers and computer systems is found in almost every setting. Information (and its exchange, retrieval, processing, updating, and, of course, safekeeping) is perhaps the most common and most important aspect of computer interaction. Most commonly, the data records are placed within a server database that has been configured to store pertinent data. This server database is typically accessed by remote computer systems ("clients") as and when the users of the client systems have needs to retrieve, manipulate or store information.

Despite advances in computer memory chip technology, the vast majority of database systems in operation today make use of physical storage systems, such as hard drives, to store the information arranged within the database structure. There are several factors which must be considered in the design and architecture of a database system; however, in almost all cases the defining issue of concern is speed. Although parallel processing and operation is commonplace with operations performed within the environment of a computer chip, the physical operations performed by hard drives and other physical storage devices mandate that nearly each and every database operation involves an activity that must be individually performed for a specific client user before the next desired operation may be performed for either the same or another next client user.

Database maintenance is a necessary evil; a properly tuned and maintained database is the most efficient in its ability to serve requests, perform updates, and record new data. During the operation of a database and subsequent periods of maintenance, it is often discovered that initial parameters are not currently desired. And greater efficiency may be achieved through fundamental restructuring of the database elements. Such processes are time-consuming; and, during such processes, the database is not available to client users for its intended purpose of serving data. Thus, mirror backups ideally must be maintained such that the level of service is not disrupted. Creating and maintaining backup copies of a database is often far from simplistic; by its nature a database is not static. Any backup copy that is developed is only a snapshot in time unless it too enjoys the same updates and modifications performed upon the primary master database. By implication, therefore, the backup server database system or systems must be similar in performance characteristics so as to keep up with the primary server database write and update operations.

In the majority of settings, client users access a server database simply for the purpose of reading data. It is not uncommon for the "Read" requests to outnumber the write requests by a factor of at least 5 to 1. For a Read request (defined as a non-transactional operation reading stored data), very little is required of the database other than to find and deliver the appropriate record being queried. Yet the physical operation of locating the record and returning its contents impose a cueing upon the client users such that their requests are processed on a first-come first-served basis.

Given that there are different operating systems (such as Microsoft Widows, OS 2, and quite a variety of flavors of Linux); there are also a variety of different off-the-shelf database applications as well as custom-developed database systems. Attempts to develop software systems to improve response times to Read requests and provide some options of scalability are, by and large, platform-specific and database-specific. This is an unattractive condition in view of the many different types of database users.

To maximize performance, and thus increase response times, it is typical for server databases to be quite robust in terms of their physical storage capabilities, processor speeds, volume of random access memory, etc. The larger and more powerful the database system, the larger numbers of client users can be served in the same amount of time. However, such size and power may be investments not fully appreciated for some time, if ever; and limitations always remain with respect to how many client users can be served adequately. Down-time in waiting for a response from the database is very frequently related to the overall level of productivity achieved by client users.

Thus, a great need exists for a system capable of improving resource management and permitting substantially simultaneous data access requests without undue expense in hardware.

OBJECTS OF THE INVENTION

It is a primary object and feature of this invention to fill the above-mentioned needs. It is a further object and feature of the present invention to provide a method and system for allocating resource needs and data access requests across a plurality of server databases, each containing a mirrored copy of the database at issue.

Still another object and feature of the present invention is to permit scattering of mirrored copies of the database by means of transparent middleware that is independent from and non-reliant upon the type of database software or operating system actually selected for use by the database system architect. Another object and feature of the present invention is to permit substantially simultaneous access to physically different records within a given database by directing each Read request to physically-separate duplicate copies of the database.

Yet another object and feature of the present invention is to permit use of the widely-available and well-understood networking methodologies of TCP/IP for interlinking and coordination of the scattered server database components. Another object and feature of the present invention is to permit automated database backup without requiring a live database to be taken off line. A further object and feature of the present invention is to permit addition or deletion of a mirroring database, either as a primary or backup system, with such addition or deletion being performed without disruption of database access to the client users.

Still another object and feature of the present invention is to provide a means for identifying and tracking the state of each mirrored copy of the database. Another object and feature of the present invention is to permit automated and systematic load balancing of resource requests throughout the scattered database system. Another object and feature of the present invention is to permit scalability of database capabilities when and as client user needs require expansion of the database, thus alleviating need for investment in hardware systems and services before such time as they are required.

SUMMARY OF THE INVENTION

In accordance with a preferred embodiment of the present invention provides a computer system for use in providing load balancing and scalable access to at least two first database replicated instances in a networked environment comprising a plurality of such first replicated database instances, available to a population of users, comprising: at least one first computer processor structured and arranged to perform record retrieval essentially simultaneously from each of such at least two first database replicated instances. Moreover, it provides such a computer system further comprising: at least one second computer processor structured and arranged to control processing of at least one update request onto each of such at least two first database replicated instances. Additionally, it provides such a computer system further comprising: at least one third computer processor structured and arranged to assign at least one unique identifier for each unique record in such at least two first database replicated instances; at least one second database structured and arranged to store such at least one unique identifier; at least one third database structured and arranged to store at least one copy of each such update request; at least one fourth database structured and arranged to store location information for each at least two first database replicated instances used for record retrieval; at least one fifth database structured and arranged to store location information for each at least two first database replicated instances to be updated; and at least one fourth computer processor structured and arranged to restore at least one instance of at least two first database replicated instances not substantially identical to all other such instances of at least two first database replicated instances to substantial identicalness with all other such instances of such at least two first database replicated instances.

Also, it provides such a computer system wherein such at least one first computer processor is further structured and arranged to: receive at least one database request from at least one end-user computer processor system; determine the nature of such at least one database request; retrieve at least one requested record from at least one instance of such at least two first database replicated instances; transmit such at least one retrieved requested record to the at least one end-user computer processor system; transmit such at least one update request to such at least one second computer processor structured and arranged to control processing of at least one update request onto each of such at least two first database replicated instances; and transmit update outcome information to the at least one end-user computer processor system. In addition, it provides such a computer system wherein such first computer processor is further structured and arranged to: randomly select at least one such instance of such at least two first database replicated instances from such at least one fourth database; update such at least one fourth database when at least one such instance of such at least two first database replicated instances is non-responsive to retrieval requests by such at least one second computer process; and randomly select at least one such instance of such at least two first database replicated instances from such at least one fourth database when at least one such instance of such at least two first database replicated instances is non-responsive to retrieval requests by such at least one second computer process. And, it provides such a computer system wherein such at least one second computer processor is further structured and arranged to: receive such at least one update request from such at least one first computer processor; insert at least one copy of such at least one update request onto such at least one third database; retrieve such location information for at least one such instance of such at least two first database replicated instances from such at least one fifth database; transmit at least one such update request to each such instance of such at least two first database replicated instances using such location information; receive such update outcome information for each such update request transmitted to each such instance of such at least two first database replicated instances; add such update outcome information to such at least one copy of such at least one update request on such at least one third database; recognize failure of such at least one instance of such at least two first database replicated instances to accept at least one such update request; transmit such update outcome information to such at least one first computer processor; and initiate such at least one fourth computer processor.

Further, it provides such a computer system wherein at least one fourth computer processor is further structured and arranged to: test presence of such at least one instance of at least two first database replicated instances not substantially identical to all other such instances of at least two first database replicated instances; test readiness of such at least one instance of at least two first database replicated instances not substantially identical to all other such instances of at least two first database replicated instances to accept update requests; retrieve at least one unprocessed update request for such at least one instance of at least two first database replicated instances not substantially identical to all other such instances of such at least two first database replicated instances from such at least one third database; transmit at least one unprocessed such update request to such at least one instance of at least two first database replicated instances not substantially identical to all other such instances of such at least two first database replicated instances; receive such update outcome information for each unprocessed such update request transmitted to each such instance of such at least two first database replicated instances not substantially identical to all other such instances of such at least two first database replicated instances; add such update outcome information to each such update request on such at least one third database; manage transmission of all such unprocessed update requests until completion; and transmit completion progress information to such at least one second computer processor. Even further, it provides such a computer system wherein such second computer processor is further structured and arranged to: receive such completion progress information from such fourth computer processor; suspend receiving such at least one update request from such at least one first computer processor when such completion progress information reaches a preset value; resume receiving such at least one update request from such at least one first computer processor when such completion progress indicates all unprocessed such updates have been applied; and transmit notification that such at least one such instance of such at least two first database replicated instances is substantially identical to all other such instances of such at least two first database replicated instances to at least one such first computer processor.

In accordance with another preferred embodiment hereof, this invention provides a computer software program, for use in providing load balancing and scalable access to at least two first database replicated instances in a networked environment comprising a plurality of such first replicated database instances, available to a population of users, comprising the step(s) of: performing record retrieval essentially simultaneously from each of such at least two first database replicated instances. Moreover, it provides such a computer software program further comprising the step(s) of: controlling processing of at least one update request onto each of such at least two first database replicated instances. Additionally, it provides such a computer software program further comprising the steps of: assigning at least one unique identifier for each unique record in such at least two first database replicated instances; storing such at least one unique identifier; storing at least one copy of each such update request; storing location information for each such at least two first database replicated instances used for record retrieval; storing location information for each such at least two first database replicated instances to be updated; and restoring at least one instance of such at least two first database replicated instances not substantially identical to all other such instances of at least two first database replicated instances to substantial identicalness with all other such instances of such at least two first database replicated instances.

Also, it provides such a computer software program further comprising the steps of: receiving at least one database request from at least one end-user computer processor system; determining the nature of such at least one database request; retrieving at least one requested record from at least one instance of such at least two first database replicated instances; transmitting such at least one retrieved requested record to the at least one end-user computer processor system; and transmitting update outcome information to the at least one end-user computer processor system. In addition, it provides such a computer software program further comprising the steps of: randomly selecting at least one such instance of such at least two first database replicated instances from such at least one fourth database; updating such at least one fourth database when at least one such instance of such at least two first database replicated instances is non-responsive to retrieval requests; and randomly selecting at least one such instance of such at least two first database replicated instances from such at least one fourth database when at least one such instance of such at least two first database replicated instances is non-responsive to retrieval requests. And, it provides such a computer software program further comprising the steps of: inserting at least one copy of such at least one update request onto such at least one third database; retrieving such location information for at least one such instance of such at least two first database replicated instances from such at least one fifth database; transmitting at least one such update request to each such instance of such at least two first database replicated instances using such location information; receiving such update outcome information for each such update request transmitted to each such instance of such at least two first database replicated instances; adding such update outcome information to such at least one copy of such at least one update request on such at least one third database; and recognizing failure of such at least one instance of such at least two first database replicated instances to accept at least one such update request.

Further, it provides such a computer software program further comprising the steps of: testing for presence of such at least one instance of such at least two first database replicated instances not substantially identical to all other such instances of such at least two first database replicated instances; testing for readiness of such at least one instance of such at least two first database replicated instances not substantially identical to all other such instances of such at least two first database replicated instances to accept update requests; retrieving at least one unprocessed update request for such at least one instance of such at least two first database replicated instances not substantially identical to all other such instances of such at least two first database replicated instances from such at least one third database; transmitting at least one unprocessed such update request to such at least one instance of such at least two first database replicated instances not substantially identical to all other such instances of such at least two first database replicated instances; receiving such update outcome information for each unprocessed such update request transmitted to each such instance of such at least two first database replicated instances not substantially identical to all other such instances of such at least two first database replicated instances; adding such update outcome information to each such update request on such at least one third database; and managing transmission of all such unprocessed update requests until completion. Even further, it provides such a computer software program further comprising the steps of: suspending receiving such at least one update request when such completion progress information reaches at least one preset value; and resuming receiving such at least one update request when such completion progress indicates all unprocessed such updates have been processed.

In accordance with another preferred embodiment hereof, this invention provides a software method, for network database environments, permitting load balancing, scalability and substantially simultaneous use by client users, comprising the steps of: providing multiple database instances wherein each such instance is substantially identical in data content, database structure, and primary key system; maintaining substantially real time records of status for each such multiple database instance; receiving a database query from at least one end-user application and determining such query to be a transactional query or non-transactional query; directing such database query to at least one selected instance of such multiple database instances upon a determination of such query being a non-transactional query; returning such non-transactional query results to the at least one end-user application; directing such database query to all instances of such multiple database instances upon a determination of such query being a transactional query; controlling such transactional queries to maintain substantial identicalness among such multiple database instances; propagating such transactional queries to such multiple database instances; returning such query results to the user; recognizing a failure in at least one instance of such multiple database instances, and adjusting to store such transactional query for later propagation; restoring such failed at least one instance of such multiple database instances to substantial identicalness with other such multiple database instances. Moreover, it provides such a method wherein each such non-transactional query is executed upon a randomly selected instance of such multiple database instances. Additionally, it provides such a method wherein the processing of such non-transactional query commands as directed by a plurality of users is substantially simultaneous.

In accordance with another preferred embodiment hereof, this invention provides a business system, for network database environments, permitting load balancing, scalability and substantially simultaneous use by client users, comprising the steps of: providing multiple database instances wherein each such instance is substantially identical in data content, database structure, and primary key system; providing a middleware software management to directly manage access to such multiple instances of the database, wherein such middleware software management performs the steps of establishing a single source for maintaining substantially real time records of status for such multiple database instances; providing a plurality of interface instances to receive a database query from at least one user, determining such query to be a transactional query or non-transactional query; directing such non-transactional query to an available instance of such multiple database instances determined to be available by such real time records of status; directing such transactional query to all available instances of such multiple database instances determined to be available by such real time records of status; returning such query results to the user.

In accordance with another preferred embodiment hereof, this invention provides a business method wherein the processes of such middleware software management and existence of such multiple instances of the database are transparent to the user, the user perceiving only a single, ultra responsive database.

Definitions, Acronyms and Cross-References

The following terms and acronyms are explained below as background and are used throughout the detailed description:

Client-Server. A model of interaction in a distributed system in which a program at one site sends a request to a program at another site and waits for a response. The requesting program is called the "client," and the program that responds to the request is called the "server." In the context of the World Wide Web, the client is typically a "Web browser" that runs on a user's computer; the program that responds to Web browser requests at a Web site is commonly referred to as a "Web server."

Database Cluster. One or more databases instances, all of which have the exact same schema or database structure (table definitions, etc.). A database cluster may contain one or more scatter sets (see definition below) each comprised of one or more database instances. While all database instances have the same schema, those contained in different scatter sets may contain different data.

Database. One or more large structured sets of persistent data maintained upon a computer system organized and structured according to a software system defining rules for organization as well responding to queries to read, write or modify data as well as provide statistical information regarding the contained data. As used herein for purposes of discussion, a database may be either a single unified system or a distributed system wherein certain database elements are located upon different systems, acting in harmony to appear as one unified database.

Domain Name System (DNS). An Internet service that translates domain names (which are alphabetic identifiers) into IP addresses (which are numeric identifiers for machines on a TCP/IP network).

Extensible Markup Language (XML). XML describes a class of data objects known as XML documents and partially describes the behavior of computer programs which process these documents. More specifically, XML is a restricted form of the Standard Generalized Markup Language (also known as SGML). XML documents are made up of storage units defined as entities which in turn comprise either parsed or unparsed data in the form of characters or simply a character. XML is designed and intended to improve the functionality of the Internet by providing more flexible and adaptive forms of information. XML can be used to store any kind of structured information and in such encapsulated form, pass it between different computer systems which would otherwise be unable to communicate.

Hypertext Markup Language (HTML). A standard coding convention and set of codes for attaching presentation and linking attributes to informational content within documents. During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyperlinks"). For more information on HTML, see Ian S. Graham, The HTML Source Book, John Wiley and Sons, Inc., 1995 (ISBN 0471-11894-4).

Hypertext Transport Protocol (HTTP). The standard World Wide Web client-server protocol used for the exchange of information (such as HTML documents and client requests for such documents) between a Web browser and a Web server. HTTP includes a number of different types of messages that can be sent from the client to the server to request different types of server actions. For example, a "GET" message, which has the format GET, causes the server to return the document or file located at the specified Universal Resource Locator (URL).

HTTPS. HTTP over SSL (Secure Sockets Layer) can be best understood as a secure form of HTTP communication. Specifically, SSL is a protocol utilized for the authentication and encryption of HTTP traffic. In operation, the server and client exchange a set of encryption keys that are used to create a unique encryption key used to encrypt all data exchanged during the session.

Internet. A collection of interconnected (public and/or private) networks that are linked together by a set of standard protocols to form a distributed network. While this term is intended to refer to what is now commonly known as the Internet, it is also intended to encompass variations that may be made in the future, including changes and additions to existing standard protocols.

Instantiate. To instantiate is to create an instance by, for example, defining one particular variation of an object within a class, giving it a name, and locating it in some physical place. In the context of the present invention instantiate is used to mean start a process or thread to complete a particular task.

LAN. A Local Area Network of computer systems, typically within a building or office, permitting networking, the associated sharing of resources and files, such as application software, printers and client information, in an inter-office setting.

Primary Keys. Primary keys permit data records to be found, placed and deleted within a database. The primary key of a table within a database is the table column whose values are different in every row. Such difference provides assurance that each row of the table can be identified uniquely. Primary Keys may be automatically generated by the database system or system assigned and provided with each instance of an entity when the entity is first entered into the database. In certain instances, the primary key may actually be a composite key generated from a plurality of columns whose values when aggregated or otherwise interpreted are different for every row.

Scatter Set. A group of Read/Write and Write-Only Databases each of which comprises a complete and exact copy of the data set and data schema, one to another. A scatter set is always a part of a database cluster (see definition above).

Semaphore. A semaphore is a synchronization object. Synchronization between two entities is rather straightforward; however, with a plurality of entities, the single bit operation of Yes/No synchronization is not sufficient. Traditionally, a semaphore has the ability to be established with an awareness of a specific number of occurrences that it will govern as well as the ability to recognize and remember the number of occurrences that have been signaled.

Structured Query Language (SQL). SQL is a standard language used to communicate with relational database management systems (such as Oracle, Sybase, Microsoft SQL Server, Access, etc.) for the purpose of performing tasks such as data insertion, deletion, update, and general query for the return of data.

The Simple Object Access Protocol (SOAP). SOAP is a lightweight XML/HTTP-based protocol for the exchange of information in a decentralized distributed platform-independent environment. Fundamentally, SOAP consists of three parts. The first is an envelope that defines a framework for describing what is contained in the message and how it should be processed. The second is a set of encoding rules for expressing instances of application-defined data types. The third is a normalized convention for representing remote procedure calls and responses.

Thread. Sometimes referred to as an execution context or a lightweight process, a thread is a sequential flow of control within a program. A thread is similar to a real process in that a thread and a running program both have a single sequential flow of control. However, the lightweight nature of a thread is bestowed because it runs within the context of a full-blown program and takes advantage of the resources allocated for that program and the program's environment. Importantly, many systems are capable of being multi-threaded, or, rather, capable of having many threads running concurrently and autonomously.

Transmission Control Protocol/Internet Protocol (TCP/IP). A standard Internet protocol (or set of protocols) which specifies how two computers exchange data over the Internet. TCP/IP handles issues such as packetization, packet addressing, and handshaking and error correction. For more information on TCP/IP, see Volumes I, II and III of Corner and Stevens, Internetworking with TCP/IP, Prentice Hall, Inc., ISBNs 0-13-468505-9 (vol. I), 0-13-125527-4 (vol. II), and 0-13-474222-2 (vol. III).

Uniform Resource Locator (URL). A unique address which fully specifies the location of a file or other resource on the Internet. The general format of a URL is protocol:// machine address:port/path/filename. The port specification is optional, and, if not entered by the user, the Web browser defaults to the standard port for whatever service is specified as the protocol. For example, if HTTP is specified as the protocol, the Web browser will use the HTTP default port. The machine address in this example is the domain name for the computer or device on which the file is located.

Read/Write Local Database. A traditional type of Database that is located on the LAN hosting the primary database center, fully enabled to perform both transactional (Write) and non-transactional (Read) operations upon the persistent dataset.

WAN. A Wide Area Network, such as the Internet.

World Wide Web ("Web"). Used herein to refer generally to both (1) a distributed collection of interlinked, user-viewable hypertext documents (commonly referred to as "Web documents", "Web pages", "electronic pages" or "home pages") that are accessible via the Internet, and (2) the client and server software components that provide user access to such documents using standardized Internet protocols. Currently, the primary standard protocol for allowing applications to locate and acquire Web documents is the Hypertext Transfer Protocol (HTTP), and the electronic pages are encoded using the Hypertext Markup Language (HTML). However, the terms "World Wide Web" and "Web" are intended to encompass future markup languages and transport protocols that may be used in place of or in addition to the Hypertext Markup Language (HTML) and the Hypertext Transfer Protocol (HTTP).

Write-Only Remote Database. A database that is not located on a LAN hosting the primary database center but across the Internet. This database is used for write operations only and serves as a backup system for the primary Read/Write Local Database(s) located on the LAN.

DETAILED DESCRIPTION OF A PREFERRED EMBODIMENT OF THE INVENTION

Preferred Embodiment

Figure 1:
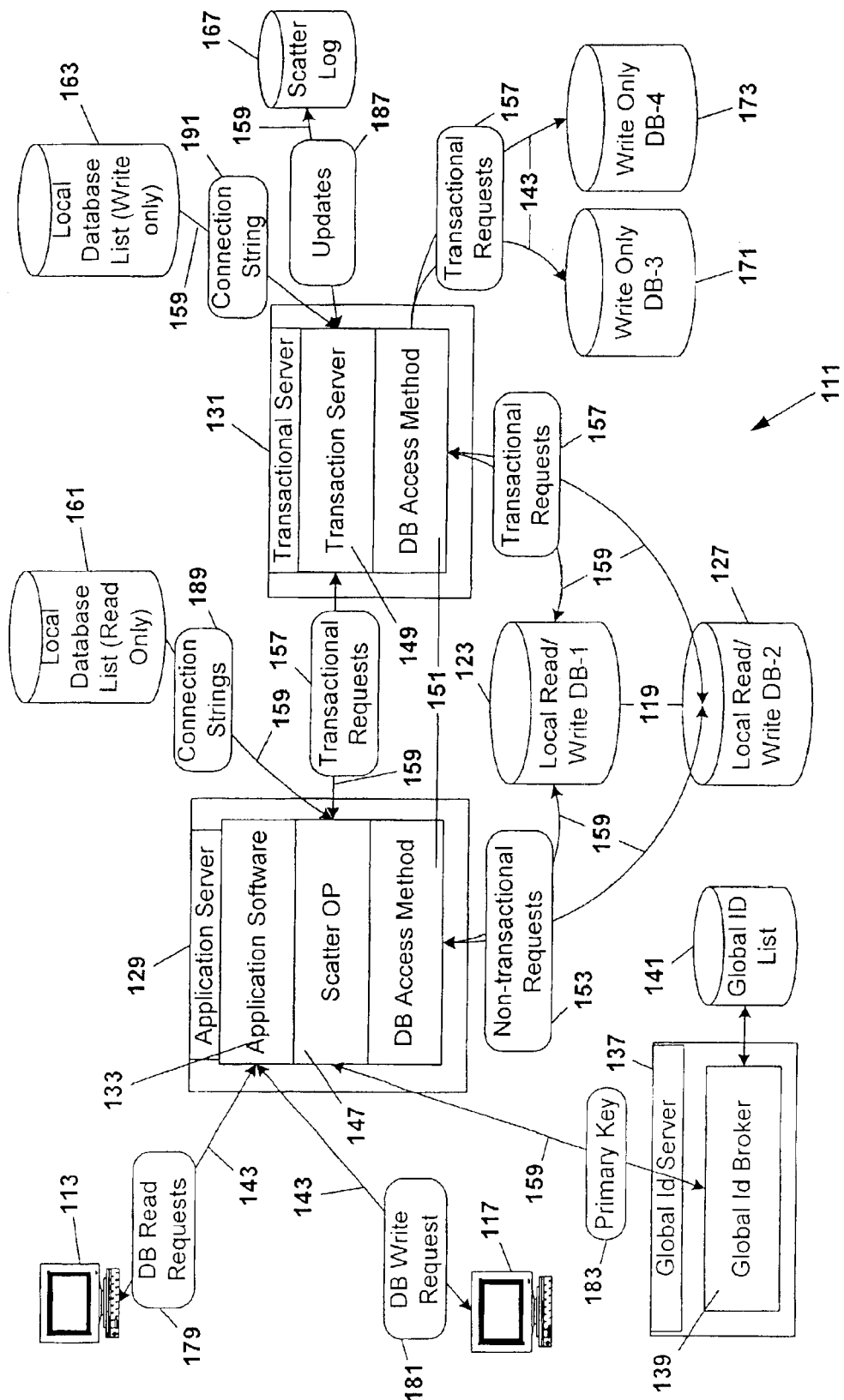
FIG. 1 is a simplified schematic illustration of the components comprising a preferred embodiment of the present invention.

With the intention of enabling the present invention to be more readily understood by those skilled in the art, while at the same time disclosing the advantages that are afforded by the present invention, the following description is subdivided to provide an overview of the primary components giving rise to a preferred embodiment of the present invention (the Transaction Server, ScatterOp, Scatter Log, Global ID Broker, and Administration System). Within each subsection of description reference is made by title to other system components when and as necessary to assist in understanding system inter-relationships.

Following the description of each sub-component and an identification of the pathways of communication between components, a description of the interaction of the components in functional application as taught by the present invention is provided.

A fundamental principle as taught by the present invention rests upon the premise that multiple database users can and will have their needs more efficiently met if each or nearly each has access to the database without having to wait in turn for database access. More specifically, just as multiple copies of the same text book permit students to review the same subject, though perhaps different portions thereof, each with their own book, so too multiple copies of a database will enhance database interaction performance. However, to insure that each instance of the database is a substantially identical peer to every other instance, transactional operations must be effectuated upon all copies of the database. As application of the present invention is primarily intended for database situations and settings where non-transactional requests outnumber transactional requests by a factor of at least 5 or 6 to 1, the benefits of simultaneous access are significant.

It is the scattering of operations while achieving homogeneous status between the multiple copies of the database that is a primary feature taught by the present invention. More specifically, it provides, preferably, that non-transactional operations are "scattered" among a plurality of substantially identical peer copies of the database.

In the accompanying drawings, well-known structures and devices are shown in block diagram form in order to provide an understanding of the interrelationship between components and the flow of information and control throughout the depicted preferred embodiment of the present invention. It will be apparent to one skilled in the art that the invention may be practiced with a variety of different specific components, without detraction or departure from the scope of the present invention, provided to serve the generalized block diagram description. Further, for the purposes of the following discussion, it is to be understood that a transactional operation upon the database is one in which data is added, modified or deleted from the database. Specific statements made with respect to any of these operations are intended to clarify the nature of the operation being performed, but should not be taken as a limitation of the operation should an alternative transactional operation be desired in a substantially similar situation or setting.

It is also to be understood that the objects comprising the preferred embodiment may be coded in a language of preference to the developer without departure from the spirit or teachings of present invention. More specifically, encoding in a particular specific language, such as C, Java, C++, C-Prime, or other language, is not to be seen as restrictive to the scope of the present invention.

Transaction Server

A preferred embodiment of the present invention provides for allocation of resource needs and data access across a plurality of databases copies (database instances) each residing on its own server. To achieve this, there is preferably a process for managing updates and the information relating to the status of the scattered database system itself, i.e., the status of each database instance.

This centralized process, as described herein, comprises the Transaction Server, an extremely lightweight application preferably existing on its own ultra-fast hardware system.

Preferably, the Transaction Server is connected solely by TCP/IP to the rest of the system embodying the present invention. Preferably, as connection to the system is by TCP/IP only, it is a connection channel established with sufficient bandwidth to accommodate the predicted level of traffic. Under appropriate circumstances, it may be desired to maintain multiple high-bandwidth connection paths with a plurality of unrelated providers such that a failure in one provider's network will not significantly impede operation of the present invention. Under appropriate circumstances, the Transaction Server may be placed within the same local network environment of the Read/Write Databases and application servers, thereby enjoying increased TCP/IP connectivity and bandwidth resources without additional costs to access providers.

Further, the Transaction Server is preferably a fast, configurable socket server operating in a multithreaded capacity to concurrently receive, process and answer all incoming requests. All data transfer to and from the Transaction Server is preferably performed in XML grammar.

Preferably, the Transaction Server performs all database command writing, maintains current information on the status of each Local Read/Write Database to ensure data integrity and each remote Write-Only Database and manages recovery of previously failed Local Read/Write Databases and Write-Only databases. Also, preferably, the Transaction Server is the sole entity responsible for maintaining a log of all pending and completed database commands (herein embodying at least one second computer processor structured and arranged to control processing of at least one update request onto each of such at least two first database replicated instances; and herein embodying controlling processing of at least one update request onto each of such at least two first database replicated instances).

Preferably, Local Read/Write Database update operations are not handled in the manner used for processing of read operations. Specifically, functionality of a database system incorporating the preferred embodiment of the present invention is preferably achieved by insuring uniform symmetry of data throughout all Local Read/Write Databases. To achieve and maintain such uniform symmetry, i.e., uniformity, the Transaction Server preferably must direct each and every write operation requested by a ScatterOp to all Local Read/Write Databases, before a subsequent write operation may be performed.

It is to be noted that for each instance of a Local Read/Write Database present in the system, there is preferably one entry in a list of connection string records used solely by the Transaction Server for accessing each Local Read/Write Database (herein embodying at least one fifth database structured and arranged to store location information for each at least two first database replicated instances to be updated). Similar to how databases themselves keep transaction logs, the Transaction Server preferably keeps a Scatter Log, logging every statement to be written to each Local Read/Write database. Preferably, before the Transaction Server attempts to write the statement to the Local Read/Write Databases in the cluster, it writes the statement to the Scatter Log. After it has attempted to write the statement to each database in the cluster, the Transaction Server preferably writes the status of each attempt for each individual Local Read/Write Database to the Scatter Log, logging commits and any failures of any individual Local Read/Write Database in the cluster or of any Write-Only database. This log is preferably used to insure data integrity and synchronization of all database servers in the cluster in the event of system failure of the Transaction Server. The Scatter Log itself is preferably a database which can be located on the Transaction Server or on another nearby server.

To successfully process updates, the Transaction Server preferably must support, at a minimum, the fundamental database commands recognizable to those skilled in the art, e.g., ExecuteGet, ExecuteGetScalar, ExecuteNonQuery, and ExecuteInsert. Further, the Transaction Server will preferably support, at a minimum, the minimum database interaction commands, e.g., Begin Transaction, Commit Transaction, and Rollback Transaction. These interaction commands serve to direct the database to begin the requested operation, effectively commit the changes of the requested transaction, and rollback and not commit the changes of the requested transaction. Proper synchronization between the Local Read/Write Databases when performing transactional operations is achieved through the use of the Scatter Log as described above.

If the Transaction Server has witnessed any failures in writing update statements to any individual Local Read/Write Database in the cluster, preferably the Transaction Server marks each failed Local Read/Write Database offline in the Scatter Log and starts a "ping" process for each failed Local Read/Write Database to determine when it is back online. As each failed Local Read/Write Database is determined to be back online the "ping" process preferably starts the recovery process for each failed Local Read/Write Database. Preferably the recovery process brings each failed Local Read/Write Database up-to-date, giving it all the update operations it missed from the Scatter Log while it was offline beginning with the transaction on which the failure occurred (herein embodying at least one fourth computer processor structured and arranged to restore at least one instance of at least two first database replicated instances not substantially identical to all other such instances of at least two first database replicated instances to substantial identicalness with all other such instances of such at least two first database replicated instances). During the recovery process, each failed Local Read/Write Database preferably remains marked as offline to the Transaction Server. Preferably, any additional updates that occur during the recovery process continue to be added to the Scatter Log as they normally would be, but marked as not written to each failed Local Read/Write database.

As the recovery process nears completion as set by a preset threshold of remaining updates, the recovery process preferably signals the Transaction Server to pause any new begin transaction requests and preferably waits until all currently pending transactions are completed (whether a commit or rollback) for all other Local Read/Write Databases, before completing the last remaining updates to the failed Local Read/Write Database and reinstating it into service. The preset threshold of remaining updates is preferably configurable by the database administrator.

The purpose for this pause is to give the recovery process a chance to "beat" the incoming volume of write requests by allowing it to finish recovering without having to worry about additional incoming commands. During periods of high write volume, if the recovery process waited until every missed statement from the Scattering Log was written to the failed Local Read/Write database, the failed Local Read/Write Database would take longer to get caught up, as new entries are added as fast as they are written to the lagging failed database. Higher threshold values cause the failed Local Read/Write Database to come back online quicker, but cause longer pause periods. Lower threshold values cause the failed Local Read/Write Database to come back online slower, but create shorter pause periods. Preferably, the total pause time is typically between 1 and 10 seconds, depending on the threshold value set.

Preferably, a slight pause is always necessary to bring the failed Local Read/Write Database back online in the same transactional context as every other database in the cluster. Preferably the Transaction Server must guarantee synchronization of Begin Transaction commands across every Local Read/Write Database in the cluster. Preferably, each Begin Transaction command issued by a ScatterOp must be completed on all Local Read/Write Databases before the next Begin Transaction command from that ScatterOp is issued by the Transaction Server to ensure that commands within the opened Begin Transaction command arrive in the same transactional context in each Local Read/Write database. Preferably, the commands within a transaction after the Begin Transaction command are managed by each Local Read/Write Database for performance reasons. Preferably, the Transaction Server may start another Begin Transaction command issued by another instance of a ScatterOp. Therefore, it is preferable that the failed Local Read/Write Database be brought back online at a point where it can synchronize Begin Transaction commands with the next incoming transaction. For this reason, it cannot be brought back online at any time. Preferably, when the failed Local Read/Write Database is completely up to date, the recovery process signals the Transaction Server to pause incoming requests so that no new Begin Transaction commands can begin until the failed Local Read/Write Database has been marked as available and can again perform Begin Transaction commands in real-time along with the other online Local Read/Write Databases. When the failed Local Read/Write Database is marked as available it also becomes available to the ScatterOp for any non-transactional operations.

Under appropriate circumstances, multiple Transaction Servers may be implemented in a cluster to improve performance. Preferably, in this arrangement the ScatterOps may send update requests to more than one Transaction Server. Preferably, there will be multiple Transaction Servers simultaneously accepting requests from multiple ScatterOps. Preferably, when a transaction has been started on one Transaction Server, it will remain the responsibility of that Transaction Server until completion, whether commitment or rollback. Preferably, once a transaction is started on a Transaction Server every subsequent statement pertaining to that transaction must be routed to the same Transaction Server, until the transaction has either committed or aborted. Preferably, each ScatterOp chooses a Transaction Server on which to execute a particular transaction in a round robin fashion. Preferably, the Scattering Log accepts transaction updates from each Transaction Server in the cluster recording the transaction requests and results in a sequential manner to ensure recovery of failed instances of the database. Preferably, a Distributed Semaphore is used to ensure that all begin transaction, commit transaction and rollback transaction statements are serialized across every Transaction Server in the cluster. This is necessary to ensure that when the Scattering Log is "played back" after a failure. The exact same begin, commit and rollback order is maintained across every instance of the singular database.

Restructuring of any data maintained by the Transaction Server, not achieved automatically through normal operation of the automated components of the system, is preferably to be performed by means of an administration application program. Such restructuring of data is understood to include, but is not necessarily limited to, the administrative tasks of updating the Transaction Server awareness of available Read/Write Databases and Write-Only Databases.

It should be noted that by intentional design of TCP/IP, communications directed to the Write-Only Databases may not always arrive in the precise sequence in which they were sent. Therefore, preferably, the Transaction Server makes use of the Scatter Log (described in further detail below) to provide a unique sequence identifier to each SQL statement transmitted to the Write-Only Databases, thus insuring that the write directives occur in the proper sequence.

Due to the nature of communication over the Internet, it is recognized that connection between the Transaction Server and the Local Read/Write Databases and Write-Only Databases is not infallible. It is therefore preferred under the present invention to permit the system administrator to define a timeout variable. If a connection to a component cannot be obtained within the defined timeout period, the connection attempt will be deemed a failure and the system will advance in accordance with its design parameters. Specifically, in most cases, such breach of a timeout period will result in the Transaction Server marking the Local Read/Write Database or Write-Only Database as effectively unavailable.

According to a preferred embodiment of the present invention, data integrity between all Local Read/Write Databases in the cluster will be maintained even in the case of an unexpected failure of the Transaction Server. Upon Transaction Server failure, preferably all transactions the Transaction Server was in progress of processing are left in the same state across each database in the cluster. Preferably, the Transaction Server is responsible for synchronizing the Begin Transaction, Commit and Rollback commands for each database in the cluster, which are the only operations throughout a transaction's lifetime which needs to be synchronized across databases to insure data integrity. Preferably, each individual database itself will manage synchronization of all related SQL commands on its own from that point. Preferably, the Commit and Rollback commands are not necessary to synchronize for a live running system, but it is necessary to know the commit order when replaying transactions for failed Local Read/Write Databases in the recovery process.

When the Transaction Server is unavailable, preferably both read access and write access are suspended to the entire system of Local Read/Write Databases until the Transaction Server comes back online. Because the Transaction Server is the only point where database write operations can be performed, its offline state alone preferably prevents any additional write operations from taking place. As noted above, read operations are performed by the ScatterOp object, outside the Transaction Server, but the ScatterOp will preferably discover the Transaction Server outage at the next write attempt. Once a ScatterOp has determined that the Transaction Server is down, preferably it notes that locally and will not allow any additional read or write access. All future read or write attempts requested of the ScatterOp preferably will first attempt to communicate to the Transaction Server to determine if it has been brought back online. Preferably, the ScatterOp will notify the requesting application of a read or write failure if the Transaction Server is offline. If the Transaction Server is online the ScatterOp will preferably proceed normally with its requests.

According to a preferred embodiment of the present invention, when the Transaction Server comes back online after a failure, preferably it can determine where it left off by comparing the Scattering Log's status for the pending transactions to the status of the transaction log for each individual Local Read/Write Database in the cluster to determine in which Local Read/Write Databases the transaction was committed and in which Local Read/Write Databases the transaction was not committed at the time of Transaction Server failure. Preferably, with this information, it can determine which databases require the transaction to be re-sent in order to bring the application's transaction to a successful completion on all the Local Read/Write Databases.

Summarizing, there is only one instance of the Transaction Server and the relationship of communications involving the Transaction Server is as follows:

| Talks to | Hears From |
| --- | --- |
| ScatterOp | ScatterOp |
| Confirm Local Read/Write Database update | Request for Local Read/Write Database update |
| Local Read/Write Database Issues update commands to each Local Read/Write database | Local Read/Write Database Commit or rollback response from each Local Read/Write database |
| Scatter Log Update to log for each update command issued to each Local Read/Write database Update to log for each commit/rollback response for each Local Read/Write database Mark Local Read/Write Databases as available or unavailable | Scatter Log Provides commit or rollback response from Scatter Log update |
| Database List (Write Only) Requests connection string for each Local Read/Write database Write Only DB Issues update commands to each Write Only database | Database List (Write Only) Provides connection string for each Local Read/Write database Write Only DB Provides Commit or rollback response |

ScatterOp

According to a preferred embodiment of the present invention, the ScatterOp is the preferred point of contact for all applications using the present invention. By intention, the ScatterOp according to a preferred embodiment of the present invention is intended to act as middle-ware, improving the performance characteristics of a database without requiring specific modification for platform-specific database applications. To achieve this preferred ability, it is preferred that applications using the system have the ScatterOp object as a primary point of contact for passing and receiving query requests to and from the database system as well as for providing write commands to the database system.

As taught under a preferred embodiment of the present invention, the ScatterOp is a standard class object interfacing directly with applications to receive users' requests and interacting with the multiple instances Local Read/Write Databases for non-transactional requests or the Transaction Server for transactional requests. Preferably, all communications with applications of are conducted by means of TCP/IP, and more specifically HTTP, HTTPS and SOAP. Preferably, all communications internal to the system between the ScatterOp and the other defined components are conducted by means of TCP/IP. Additional interaction protocols necessary to maintain, pass and parse XML grammar to propagate and perform the requisite SQL statements will become apparent to those skilled in the art and may be incorporated under appropriate circumstances without departing from the teachings of the present invention.

Upon receiving SQL statements from the application, the ScatterOp is responsible for performing read operations upon the Local Read/Write Databases and for transmitting the SQL statements directing write operations to the Transaction Server, after obtaining an appropriate Primary Key from the Global ID Broker for Insert requests. To achieve this, the ScatterOp preferably must support, at a minimum, the fundamental database commands recognizable to those skilled in the art, e.g., ExecuteGet, ExecuteGetScalar, ExecuteNonQuery, and ExecuteInsert.

More specifically, applications using the database system incorporating a preferred embodiment of the present invention must transparently interact with the ScatterOp in place of the standard data transport mechanisms (such as, but not limited, to ADO, ODBC, and JDBC). Access to an actual database component is only achieved by means of the ScatterOp, and any attempt to connect to a scattered database component without the involvement of the ScatterOp is preferably not permitted, as such unregulated access, especially for write access, may result in non-synchronous copies of the database elements. Under appropriate circumstances and with appropriate safeguards, external read-only access may be desired upon a Write-Only Database. Such access and use may be desired, under certain controlled specific instances of system-intensive queries, such as content and index queries to be placed on a Write-Only Database to minimize the impact on the primary Local Read/Write Databases.

Scalability is preferably achieved by enabling a preferred embodiment of the present invention to operate with a plurality of ScatterOp objects, each ScatterOp instance being instantiated upon the request of the application after connection of a client user, and each ScatterOp instance operating in relative autonomy from other ScatterOp instances while in parallel completing all query operations as directed by the client users' provided SQL statements (herein embodying at least one first computer processor structured and arranged to perform record retrieval essentially simultaneously from each of such at least two first database replicated instances; and herein embodying performing record retrieval essentially simultaneously from each of such at least two first database replicated instances).

As taught under the a preferred embodiment of the present invention, the location of the hardware supporting the ScatterOps is a matter of individual choice, preferably dictated by desired system performance and the perceived requirements of the system. As server generated objects, ScatterOps may be provided from the same physical system upon which a Local Read/Write Database may be located or upon a physically separate system (dedicated to serving ScatterOps, the application server or another server providing additional related or unrelated system services). Preferably, in either case, interaction with the Local Read/Write Databases and non-local Write-Only Databases is maintained by TCP/IP.

The proper operation of any database is predicated upon a system of Primary Keys (defined above) used for the organization and location of data records. Where a copy of a database is made, a copy of the Primary Keys will occur naturally. When dealing with a live database and subsequent live duplicate copies of the database, it is important that the Primary Key system be uniform among all instances of the database. More specifically, it is important that a new data record added to the database, for example "John Smith," be added with the same Primary Key, for example "28088020274," in all instances of the database such that later operations upon the record may be performed with but one reference to the Primary Key. Preferably, to achieve such synchronization under the present invention, the ScatterOp will obtain Primary Keys when, and as, necessary from the Global ID Broker, discussed more completely below.

The ScatterOp achieves a preferred level of system resource allocation by preferably assigning requests for database "read" (non-transactional) access in a random style of processing. More specifically, in response to the first read request, the ScatterOp will preferably randomly retrieve the address (connection string) for Local Read/Write Database "n" from the local list of database connection strings (herein embodying at least one fourth database structured and arranged to store location information for each at least two first database replicated instances used for record retrieval.) The second non-transactional request received by the ScatterOp will preferably result in the ScatterOp choosing a second connection string randomly from the local list of database connection strings. Preferably, the ScatterOp will continue to randomly select connection strings without regard to which database connection string was previously chosen. In such random fashion, identical instances of the Local Read/Write Database are capable of substantially simultaneous parallel access and use by multiple application instances without having to persist which Local Read/Write Database was accessed last, thereby preferably improving overall performance.

Under appropriate circumstances, it may be desirable for administrators of the system to assign usage weight factors to each Local Read/Write Database to preferably influence the number of read requests sent to each Local Read/Write database. Preferably, this allows the administrator of the system to take advantage of differing hardware performance characteristics. For example, if there are two Local Read/Write Databases in a cluster, and one of them is operating on dual processor computer and the other is on single processor computer, setting the usage weight to 2 for the dual processor server and 1 for the single processor server, preferably will cause twice as many requests to be sent to the dual processor server.

Preferably, the ScatterOp gracefully handles Local Read/Write Database failure, as long as at least one operating Local Read/Write Database in the cluster is available. If all Local Read/Write Databases in the cluster fail, an exception situation arises and the requesting application is notified the read request has failed. Preferably, the ScatterOp discovers failed databases by marking it as unavailable locally only when a read request fails. When the ScatterOp discovers that a Local Read/Write Database is down and cannot be read, preferably it will not retry the failed Local Read/Write Database on subsequent calls, and moves onto the next Local Read/Write Database in the cluster to attempt to retrieve the request information. The ScatterOp will preferably query the Transaction Server regarding each failed Local Read/Write Database every configurable number of read hits to see if it has come back online yet. Preferably, the frequency of queries is configurable in the ScatterOp configuration file by setting how many hits of the failed database will occur before retrying. Preferably, this number is not the number of database reads, but the number of times the scattering algorithm would have normally selected the failed Local Read/Write Database for reading, but skipped it because it was marked as offline. So, if this number is set to fifty, and there are two Local Read/Write Databases in the cluster, it is close to one hundred reads before it will be retried.

Under appropriate circumstances, a Quick Fail Recovery optimization may be implemented to more quickly recover from individual Local Read/Write Database failures. Preferably, when Quick Fail Recovery is used, the ScatterOp or Transaction Server first sends a quick SQL statement to the database with a one second timeout value. If this command does not succeed, preferably the database is assumed to be offline, and the real command preferably will not attempt to execute with a standard timeout value. In this way, the preferred pause for a failed database will be less than one second instead of the ten to fifteen seconds required for usual read commands to report a failure. Quick Fail Recovery usage does increase query execution time by about ten percent. Preferably, it is only used when there are a large number of Local Read/Write Databases in the cluster, and Local Read/Write Databases are frequently taken out of the cluster for maintenance.

Summarizing, there are preferably a plurality of ScatterOps, each of which is state aware. The relationship of communication involving the ScatterOp is as follows:

| Talks to | Hears From |
| --- | --- |
| Application | Application |
| Provides data requested for Read operation SQL | Provides Read operation SQL |
| Provides confirmation of Write operation SQL | Provides transactional Write operation SQL |
| Transaction Server | Transaction Server |
| Provides Request for Local Read/Write Database update | Provides online/offline status of Local Read/Write Databases |
| Provides SQL commands | |
| Local Read/Write Database | Local Read/Write Database |
| Provides SQL to query Read | Provides data requested by Read operation SQL |
| Notes failed Local Read/Write Databases | |

Scatter Log

According to a preferred embodiment of the present invention, the Transaction Server keeps a Scatter Log, logging every statement to be written to each Local Read/Write Database. Preferably, before the Transaction Server attempts to write the statement to the Local Read/Write Databases in the cluster, it writes the statement to the Scatter Log. After it has attempted to write the statement to each database in the cluster, the Transaction Server preferably writes the status of each attempt to the Scatter Log, including any failures on any individual Local Read/Write Database in the cluster (herein embodying at least one third database structured and arranged to store at least one copy of each such update request; and herein embodying storing at least one copy of each such update request).

In this manner, the Scatter Log is preferably used to insure data integrity and synchronization of all Local Read/Write Databases in the cluster in the event of system failure of the Transaction Server.

Preferably, the Scatter Log itself is a database, which can be located on the Transaction Server or on another nearby server.

| Talks to | Hears From |
| --- | --- |
| Transaction Server | Transaction Server |
| Provides Request for Local Read/Write Database update | Provides commit or rollback response |
| Provides SQL Commands | |
| Provides status of each Request for Local Read/Write Database update for each Local Read/Write Database | |
| Provides status of each Local Read/Write Database | |
| Provides status of each Write-Only Database | |

Global ID Broker

The traditional purpose of a database is to organize data such that it may be used and or modified at some future time. It is therefore critical that some standard of organization be employed. Most commonly, database systems, especially relational database systems, employ an organizational system based upon Primary Keys. Under a preferred embodiment of the present invention, multiple instances of the same database will require updates at substantially the same time. As each database instance is preferably an indistinguishable copy of every other database instance, it is of substantial importance that the Primary Keys used for the insertion of data be uniform across all Local Read/Write Database and Write-Only Database instantiations. More specifically, it is important that a new data record added to the database, for example "John Smith," be added with the same Primary Key, for example "28088020274," in all instances of the database such that later operations upon the record may be performed with but one reference to the Primary Key (herein embodying at least one second database structured and arranged to store such at least one unique identifier; and herein embodying assigning at least one unique identifier for each unique record in such at least two first database replicated instances.) Preferably, to achieve such synchronization according to a preferred embodiment of the present invention, a web-based Global ID Broker is accessible to the ScatterOps and provides Primary Keys when requested. It is noted that, because uniform key sequence must be maintained, there is preferably only one Global ID Broker in operation within the preferred embodiment of the present invention at any given time (herein embodying at least one third computer processor structured and arranged to assign at least one unique identifier for each unique record in such at least two first database replicated instances; and herein embodying storing such at least one unique identifier).

In accordance with the web-based communication and XML grammar harmony used under the present invention, preferably each new Primary Key value provided and each Primary Key itself is preferably maintained as XML records, preferably date and time stamped. Persons skilled in the art will appreciate that Primary Keys may be modified and updated from time to time.

Summarizing, there is preferably only one instance of the Global ID Broker in operation at any time and the relationship of communication involving the Global ID Broker is as follows:

| Talks to | Hears From |
| --- | --- |
| ScatterOp | ScatterOp |
| Provides primary key | Request for primary key |

Administration System

Those skilled in the art of database maintenance and management will appreciate that an Administration System will be used to permit the information within the preferred embodiment of the present invention to be updated and corrected as may be required with the addition or deletion of new or restored Local Read/Write Database and Write-Only Database systems.

The precise nature of the Administration System may be appropriately designed and modified, etc., depending upon the nature of the database to which a preferred embodiment of present invention is applied; however, it is preferred that this system provide administrators with a centralized web-based utility permitting modification of all records within the present invention without requiring manual editing of the XML files. Preferably, the Administration System will provide the system administrator with a repertoire of system resources and tools to test and confirm operability of all system components.

A preferred embodiment of the present invention, as at least one feature thereof, is intended to serve as middleware between the client user and a database without concern to the operating system supporting the database, the Administration System will preferably provide user-configurable command statements that will be relied upon by a preferred embodiment of the present invention for proper operation in a variety of operating system environments.

Operation Overview

FIG. 1 is a depiction of a computer network environment 111 used to implement a preferred embodiment of a scattered database system of the present invention. In application, the preferred embodiment of the present invention comprises a transparent middleware application that operates between the Users 113 and 117 and the singular database 119 perceived by the users 113 and 117 to exist as a single instance of the database (herein embodying providing a middleware software management to directly manage access to such multiple instances of the database). In actuality, the preferred embodiment provides multiple identical copies (instances) of the singular database 119, such as Local Read/Write Databases 123 and 127 and Write Only Databases 139 and 140, such that directives issued by the Application Software 133 in use by Users 113 and 117 may be carried out in parallel upon the separate, yet preferably substantially identical, instances of the singular database 119 (herein embodying providing multiple database instances wherein each such instance is substantially identical in data content, database structure, and primary key system; and herein embodying providing multiple database instances wherein each such instance is substantially identical in data content, database structure, and primary key system).

Preferably, existing as a network-based system, the components according to a preferred embodiment of the present invention are preferably sub-grouped into two categories, components which must exist within a local area network, and those which may exist anywhere within the Internet, i.e., more specifically, they are part of the computer network environment 111 but are not required to be physically local components. Along with the Application Software 133, the components of the preferred embodiment of the present invention which must exist within a local area network are the Local Read/Write Databases 123 and 127, Global ID Broker 139, Global ID List 141, Transaction Server 149, Local Database List (Read Only) 161, Database List (Write Only) 163, Scatter Log 167, and the ScatterOp 147.

The system components, which may be located anywhere in the computer network environment 111, are preferably the Write Only Databases 171 and 173. Communication between the local system components and those that may exist outside of the local anywhere is preferably achieved by means of TCP/IP connections 143.

Since preferred embodiments of this invention exist essentially as transparent middleware, there are preferably no required modifications to be performed or required upon the Application Software 133 used by users 113 or 117. Preferably, Users 113 or 117 engage the Application Software 133 in a normal course of operation which is capable of performing database interaction utilizing TCP/IP connections 143 over the normal channels of the Internet. More specifically, the interaction of users 113 or 117 with the database is preferably permitted by a web-enabled database interface application provided by a preferred embodiment of the present invention.

In summary, preferably when the Application Software 133 used by User 113 or 117 requires information from the Singular database 119, the Application Software 133 instantiates a copy of the ScatterOp 147, which in turn, will determine the nature of the request, then complete the request as appropriate, either returning the requested data or confirming that a requested update has been completed successfully (herein embodying determining the nature of such at least one database request).

More specifically, when User 113 requests specific information from the Singular Database 119 via a DB Read Request 179 to the Application Software 133, preferably a copy of the ScatterOp 147 will be instantiated to access a randomly selected copy of Singular Database 119, Local Read/Write Database-1 123 or Local Read/Write Database-2 127, using the selected Database Access Method 151 and return the requested information to the Application Software 133 which in turn presents it to User 113 (herein embodying receive at least one database request from at least one end-user computer processor system; and herein embodying retrieve at least one requested record from at least one instance of such at least two first database replicated instances; and herein embodying transmit such at least one retrieved requested record to the at least one end-user computer processor system). The instantiated copy of the ScatterOp 147 preferably establishes an TCP/IP connection 159 and retrieves the required Connection String 189 information for each Local Read/Write Database-1 123 or Local Read/Write Database-2 127 from the Local Database List (Read Only) 161 which is an XML file maintained by the system administrator (herein embodying storing location information for each such at least two first database replicated instances used for record retrieval).

Alternatively, when User 117 requests an update via a DB Write Request 181 to the Singular Database 119, preferably the Application Software 133 will instantiate a copy of the ScatterOp 147, which will determine how the update request should be handled. If the DB Write Request 181 is to add a new record to the Singular Database 119 the ScatterOp 147 will preferably establish a TCP/IP connection 159 and obtain a new Primary Key 183 from the Global ID Broker 139. Once it has a Primary Key 183, it will then establish a TCP/IP connection 159 to the Transaction Server 149 and provide the combined information as a Transactional Request 157 for the Transaction Server 149 to manage adding the record to each Local Read/Write Database 123 and 127 (herein embodying transmit such at least one update request to such at least one second computer processor structured and arranged to control processing of at least one update request onto each of such at least two first database replicated instances). Preferably, on successful completion of the request the Transaction Server 149 notifies the ScatterOp 147 which, in turn, notifies the application, which in turn, notifies User 117. Preferably, the Transaction Server 149 manages each update to each Local Read/Write Database 123 and 127 by first establishing a TCP/IP connection 159 and writing an Update 187, which includes the requested update information to the Scatter Log 167, which serves as a recovery log in the event of a failure to successfully update any Local Read/Write Database or the failure of the Transaction Server 149 itself. Preferably, the Transaction Server 149 then establishes a TCP/IP connection 159 and obtains the necessary Connection String 191 information from the Database List (Write Only) 163, which is an XML file, preferably maintained by the system administrator. Preferably, the Database List (Write Only) 163 is similar to the Local Database List (Read Only) 161 XML file, but it may contain entries for copies of the Singular database 119 such as Write Only Database DB-3 171 and Write Only Database DB-4 173 which are preferably not accessible by the ScatterOp 147, but are used as back up or as dedicated database query servers. After obtaining the necessary Connection String 191 for each Local Read/Write Database 123 and 127 and Write Only Database 171 and 173 the Transaction Server 149 establishing a TCP/IP connection 159 completes the Transaction Request 157 with each Local Read/Write Database 123 and 127 and Write Only Database 171 and 173 in turn. After each update attempt the Transaction Server 149 updates the Scatter Log as to its success or failure. After completion of the update cycle the Transaction Server 149 re-establishes a TCP/IP connection 159 with the ScatterOp 147 and notifies the ScatterOp 147 of the final status of the completion of the Transaction Request 157 the ScatterOp 147 then in turn notifies the application, which in turn notifies User 117 (herein embodying transmit update outcome information to the at least one end-user computer processor system).

All communication between components of the present invention described above is preferably via https connections 159 over TCP/IP on a local area network. All communication between the Transaction Server 149 and the Write Only Database 171 or 173 is via https connections 143 over TCP/IP on a wide area network such as the Internet. It is recognized that, under appropriate circumstances, http may be used in place of https; however, https is preferred as a more secure means of transferring data.

Figure 2:
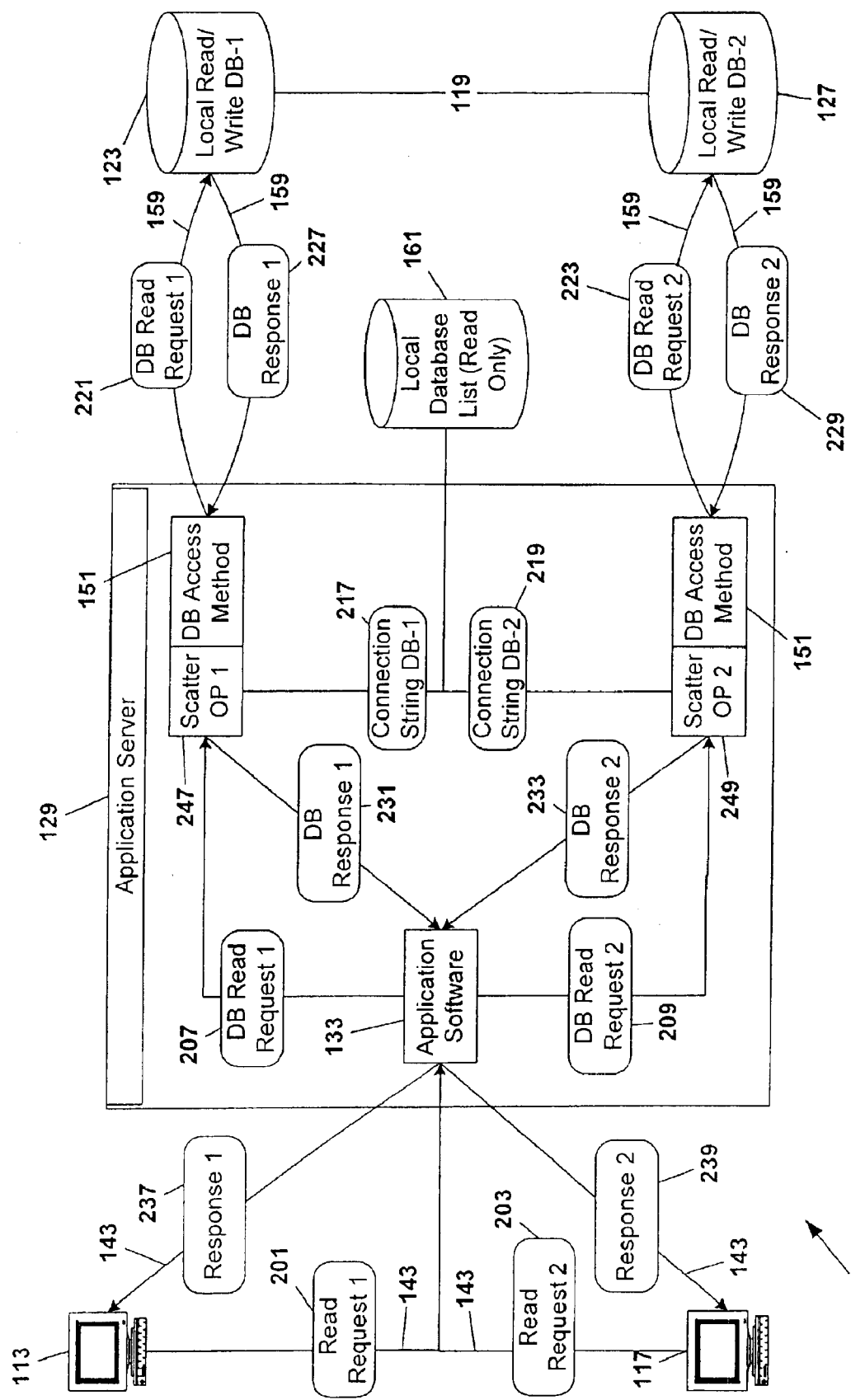
FIG. 2 is a simplified schematic illustration of the present invention processing a non-transactional query operation according to a preferred embodiment.

Referring to FIG. 2, depicted is a representation of the components of a preferred embodiment of the present invention required to a request for information represented by Read Request 1 201 User 113. As shown in FIG. 2, establishing the preferred nature of the present invention, in response to the incoming https database command, in this case a Read Request 1 201, over an https connection 143, the Application Software 133 instantiates a ScatterOp1 247 to manage the process of retrieving the requested information from an instance of the Singular database 119 (herein embodying receiving at least one database request from at least one end-user computer processor system). Typically, the incoming requests, such as Read Request1 201, are received by the Application Software 133 as an https request over an https connection 143. Under appropriate circumstances, the request may be simply http. In either case, hereinafter either is understood as interchangeable with respect to the present invention. It is to be understood and appreciated that separate and substantially autonomous ScatterOp copies, such as ScatterOp 1 247 ScatterOp 2 249, are instantiated for each separate connection request from User 113 and 117 (herein embodying providing a plurality of interface instances to receive a database query from at least one user). Preferably, the Application Server 129 has been physically enabled with sufficient random access memory, one or more central processors, and sufficient system resources and connectivity bandwidth to accommodate an appropriate number of instances of the ScatterOp, as may be appropriate for the given Application Software 133. The distribution of incoming read requests among a plurality of physical web servers is well understood by those skilled in the art.

The SQL statement, based on Read Request 1 201, delivered to ScatterOp1 247 by the Application Software 133 is reviewed to determine whether it is a transactional or non-transactional request. Preferably, operations requiring actual modification to data maintained upon a database, such as an addition, deletion, or modification are classified as transactional. Preferably, operations requiring no modification to the data maintained upon the database are classified as non-transactional (herein embodying determining the nature of such at least one database request; and herein embodying receiving a database query from at least one end-user application and determining such query to be a transactional query or non-transactional query; and herein embodying determining such query to be a transactional query or non-transactional query).

FIG. 2 further provides a flow diagram illustrating the connection paths and operation flow of a system operating under an preferred embodiment of the present invention as it responds to two nearly simultaneous user requests to perform read queries upon the database. Prior to the development of the present invention, such simultaneous queries could not be performed upon the vast majority of common database systems.

User 113 transmits a Read Request 1 201 (a non-transactional database request) to the Application Software 133 utilizing a preferred embodiment of the present invention by means of https over an https connection 143, as he or she would with a traditional network enabled database system. In response to the incoming Read Request 1 201 directed to the proper port, the Application Software 133 preferably instantiates ScatterOp 1 247 along with its copy of the Local Database List (Read Only) 161. Preferably, upon a determination that the incoming Read Request 201 from user 113 is non-transactional, ScatterOp 1 247 randomly selects a DB Connection String 1 Request 217 for an available Local Read/Write DB-1 123 from Local Database List (Read Only) 161 (herein embodying randomly selecting at least one such instance of such at least two first database replicated instances from such at least one fourth database; and herein embodying directing such database query to at least one selected instance of such multiple database instances upon a determination of such query being a non-transactional query; and herein embodying directing such non-transactional query to an available instance of such multiple database instances determined to be available by such real time records of status). The DB connection String 1 211 retrieved by ScatterOp 1 247 will preferably be arranged in XML and contain all the required information to locate and achieve a connection to the indicated Local Read/Write DB-1 123. Preferably, the DB Connection String 1 217 is inclusive of a domain name rather than a static IP address as the practice of resolving the domain name through a DNS provider permits near real time modification and redirections to be implemented without modifying data maintained by Local Database List (Read Only) 161. Preferably, ScatterOp 1 247 will parse the string, according to the rules of XML grammar, and then will attempt to establish a TCP/IP connection 159 with Local Read/Write DB-1 123 and initiate the DB Read Request 1 221 which preferably includes the appropriate SQL statements as required by the database access method 151 set by the database manager vendor. If the TCP/IP connection 159 and DB Read Request 1 221 are successful, preferably DB Response 1 227, containing the requested information is returned to the ScatterOp 1 247 (herein embodying retrieving at least one requested record from at least one instance of such at least two first database replicated instances.) Preferably, ScatterOp 1 247 will, in turn, send DB Response 1 227 to the Application Software 133, which provides Response 1 237 to User 113 to satisfy the original request (herein embodying transmitting such at least one retrieved requested record to the at least one end-user computer processor system; and herein embodying returning such non-transactional query results to the at least one end-user application). If either the TCP/IP connection 159 or DB Read Request 1 221 are unsuccessful, ScatterOp 1 247 preferably will note the failure of Local Read/Write DB-1 123 in its copy of the Local Database List (Read Only) 161 so that no further read attempts will be made until Local Read/Write DB-1 123 is available. After marking Local Read/Write DB-1 123 as failed, preferably ScatterOp 1 247 will randomly select another Local Read/Write DB-2 127 and attempt to satisfy the original request; (herein embodying update such at least one fourth database when at least one such instance of such at least two first database replicated instances is non-responsive to retrieval requests by such at least one second computer process; and herein embodying randomly select at least one such instance of such at least two first database replicated instances from such at least one fourth database when at least one such instance of such at least two first database replicated instances is non-responsive to retrieval requests by such at least one second computer process; and herein embodying updating such at least one fourth database when at least one such instance of such at least two first database replicated instances is non-responsive to retrieval requests; and herein embodying randomly selecting at least one such instance of such at least two first database replicated instances from such at least one fourth database when at least one such instance of such at least two first database replicated instances is non-responsive to retrieval requests; and herein embodying maintaining substantially real time records of status for each such multiple database instance). Preferably, only in the case that ScatterOp 1 247 cannot successfully satisfy the original request after attempting to access every Local Read/Write Database will it return a failure notice to the Application Software 133 and ultimately User 113.

It is recognized that, under appropriate circumstances, http may be used in place of https; however, https is preferred as a more secure means of transferring data.

At substantially the same time that User 113 initiates the transaction described above, User 117 transmits Read Request 2 203 (also a non-transactional database request) to Application Software 133, by means of https over Https connection 143, as he or she would with a traditional network enabled database system. Preferably, in response to the incoming Read Request 2 203 directed to the proper port, the Application Software 133 instantiates ScatterOp 2 249 along with its copy of the Local Database List (Read Only) 161. Upon a determination that the incoming request from User 117 is non-transactional, preferably ScatterOp 2 249 randomly selects a Connection String DB-2 Request 219 for an available Local Read/Write DB-2 127 from Local Database List (Read Only) 161. The DB connection String 2 219 retrieved by ScatterOp 2 249 will preferably be arranged in XML and contain all the required information to locate and achieve a connection to the indicated Local Read/Write DB-2 127. Preferably, the DB Connection String 2 219 is inclusive of a domain name rather than a static IP address as the practice of resolving the domain name through a DNS provider permits near real time modification and redirections to be implemented without modifying data maintained by Local Database List (Read Only) 161. Preferably, ScatterOp 2 249 will parse the string, according to the rules of XML grammar, and then will attempt establish a TCP/IP connection 159 with Local Read/Write DDB-2 127 and initiate the DB Read Request 2 223, which includes the appropriate SQL statements, as required by the database access method 151 set by the database manager vendor. If the TCP/IP connection 159 and DB Read Request 2 223 are successful, preferably DB Response 2 229, containing the requested information, is returned to the ScatterOp 2 249. Preferably, ScatterOp 2 249 will, in turn, send DB Response 2 229 to the Application Software 133, which provides Response 2 239 to User 117 to satisfy the original request. If either the TCP/IP connection 159 or DB Read Request 2 223 are unsuccessful preferably ScatterOp 2 249 will note the failure of Local Read/Write DB-2 127 in its copy of the Local Database List (Read Only) 161 so that no further read attempts will be made until Local Read/Write DB-2 127 is available again. After marking Local Read/Write DB-2 127 as failed ScatterOp 2 249 will randomly select another Local Read/Write DB-1 123 and attempt to satisfy the original request. Preferably, only in the case that ScatterOp 2 249 can not successfully satisfy the original request after attempting to access every Local Read/Write Database will it return a failure notice to the Application Software 133 and ultimately User 117.

In the preferred embodiment of the present invention, ScatterOp 1 247 and ScatterOp 2 249 preferably select connection strings in a random fashion from their respective copies of the Local Database List (Read Only) 161, wherein the first request is directed to a Local Read/Write Database "n", the second request is sent to another Local Read/Write Database or the same system, depending on the outcome of the random sequence of selection (herein embodying randomly select at least one such instance of such at least two first database replicated instances from such at least one fourth database). Preferably, this method ensures rapid access without having to retain information about the last system accessed and minimizes the potential for failure due to loss of the information about the selection scheme. Preferably, under this preferred embodiment of the present invention, the database systems provided for the non-transactional operations are from the universe of known and available Local Read/Write Databases. Preferably, in such fashion, it is possible for the present invention to permit a multitude of users to query different records from different instances of the substantially identical database at substantially the same time.

Preferably, upon delivery of DB Response 1 231 and DB Response 2 233 to the Application Software 133 the connections 159 between the ScatterOps 1 247 and ScatterOps 2 249 and Local Read/Write DB-1 123 and Local Read/Write DB-2 127 are closed, and ScatterOp 1 247 and ScatterOp 2 249 are terminated.

In such fashion, and with respect to FIG. 2, it can be appreciated that the illustrated preferred embodiment is capable of providing client user 113 with access to data records upon Local Read/Write DB-1 123 while client user 117 is provided with access to the data records upon Local Read/Write DB-2 127 in a substantially parallel process. As the data is maintained in physically different locations within a given instance of a database, such parallel access is significantly frustrated in database environments not employing the present invention.

All communication between components of the present invention described above is preferably via TCP/IP connections 159 on a local area network.

Figure 3:
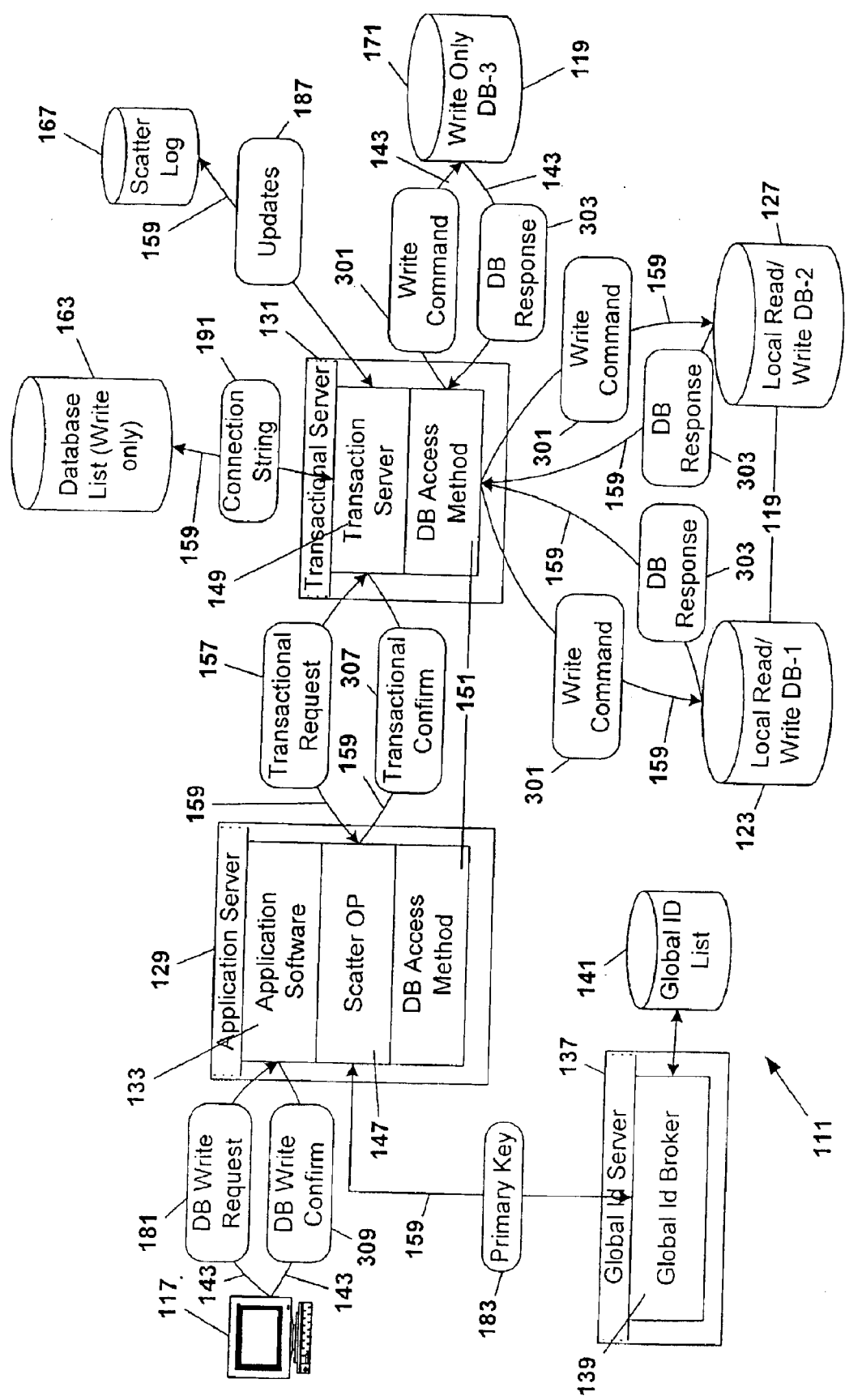
FIG. 3 is a simplified schematic illustration of the present invention processing a transactional query operation according to a preferred embodiment.

FIG. 3 provides a flow diagram illustrating the connection paths and operation flow of a computer network environment 111 operating under a preferred embodiment of the present invention as it responds to a transactional operation upon the database, for example, a write command. To maintain functionality of the multi-instance database under a preferred embodiment of the present invention, it is necessary to perform the transactional operation upon all copies of the database.

User 117 transmits a DB Write Request 181 (a transactional database request), by means of https over an https connection 143, as he or she would with a traditional network enabled database system. Preferably, in response to the incoming DB Write Request 181 directed to the proper port, the Application Software 133 instantiates ScatterOp 147. Preferably, upon a determination that the DB Write Request 181 from the User 117 is transactional and that the request is to add a new record to the Singular database 119, ScatterOp 147 initiates a TCP/IP connection 159 to the Global ID Broker 139 to request a Primary Key 183. To achieve this identical identification of the new record across all peer instances of the Singular database 119, the use of an external Primary Key 183 is necessary. In response to the connection and request, Global ID Broker 139 returns a proper Primary Key 183 to ScatterOp 147. Preferably, ScatterOp 147 then establishes a TCP/IP connection 159 with Transaction Server 149 and the Transaction Request 157, which includes the Primary Key 183, is passed to Transaction Server 149. (Herein embodying receive such at least one update request from such at least one first computer processor.)

Preferably, upon receipt of a Transaction Request 157 Transaction Server 149 establishes a TCP/IP connection 159 with the Scatter Log 167 and adds the Transaction Request 157 to it (herein embodying insert at least one copy of such at least one update request onto such at least one third database; and herein embodying inserting at least one copy of such at least one update request onto such at least one third database). Preferably, the Scatter Log 167 is a database that retains each Transaction Request 157 and its status with regard to all instances of the Singular database 119. Preferably, after successfully adding Transaction Request 157 to the Scatter Log 167 the Transaction Server 149 retrieves a connection string 191 from the Database List (Write Only) 163 for each Local Read/Write DB-1 123 and Local Read/Write DB-2 127 and Write Only DB-3 171 (herein embodying retrieve such location information for at least one such instance of such at least two first database replicated instances from such at least one fifth database; and herein embodying storing location information for each such at least two first database replicated instances to be updated; and herein embodying retrieving such location information for at least one such instance of such at least two first database replicated instances from such at least one fifth database). (Multiple instances of write only databases may be implemented, but only one is shown for clarity.)

Preferably, the connection string 191 for Local Read/Write DB-1 123 and Local Read/Write DB-2 127 and Write Only DB-3 171 is comprised of the host name for the Local Read/Write DB-1 123 and Local Read/Write DB-2 127 and Write Only DB-3 171.

With the DB connection strings 191 obtained, Transaction Server 149 further prepares for the execution of the transaction operation by preferably instantiating multiple threads establishing a TCP/IP connection 159 to Local Read/Write DB-1 123 and Local Read/Write DB-2 127 and an https connection 143 to Write Only DB-3 171 respectively, as indicated by the preference of host names provided by the Database List (Write Only) 163. Proper handshaking confirms the connection and the write command 301 is provided by Transaction Server 149 to Local Read/Write DB-1 123 and Local Read/Write DB-2 127 and Write Only DB-3 171 (herein embodying transmit at least one such update request to each such instance of such at least two first database replicated instances using such location information; and herein embodying transmitting at least one such update request to each such instance of such at least two first database replicated instances using such location information; and herein embodying directing such database query to all instances of such multiple database instances upon a determination of such query being a transactional query; and herein embodying propagating such transactional queries to such multiple database instances; and herein embodying directing such transactional query to all available instances of such multiple database instances determined to be available by such real time records of status). In accordance with proper database policies and procedures as required by the underlying database to which the present invention is applied, the write command 301 is appropriately committed or rolled back as evidenced by a DB Response 303 sent back to ScatterOp 147 by Local Read/Write DB-1 123 and Local Read/Write DB-2 127 and Write Only DB-3 171 (herein embodying receive such update outcome information for each such update request transmitted to each such instance of such at least two first database replicated instances; and herein embodying recognize failure of such at least one instance of such at least two first database replicated instances to accept at least one such update request; and herein embodying receiving such update outcome information for each such update request transmitted to each such instance of such at least two first database replicated instances).

Preferably, upon receipt of DB Response 303 from Local Read/Write DB-1 123 and Local Read/Write DB-2 127 and Write Only DB-3 171, Transaction Server 149 writes the DB Response 303 from each instance of Singular database 119 as an update 187 to the Scatter Log 167 for each Transactional Request 157 (herein embodying add such update outcome information to such at least one copy of such at least one update request on such at least one third database; and herein embodying adding such update outcome information to such at least one copy of such at least one update request on such at least one third database). Preferably, recording the DB Response 303 from each instance of Singular database 119 allows Transaction Server 149 to track the success or failure of each Transaction Request 157 on each instance of Singular database 119 (herein embodying establishing a single source for maintaining substantially real time records of status for such multiple database instances).

Preferably, if the Write Command 301 was successfully committed to say, Local Read/Write DB-1 123, Transaction Server 149 will send a transactional confirm 307 back to the initiating ScatterOp 147. Preferably, ScatterOp 147 will in turn notify the Application Software 133 of the successful update, which will notify initiating User 117 via a DB Write Confirm 309 (herein embodying transmitting update outcome information to the at least one end-user computer processor system; and herein embodying returning such query results to the user; and herein embodying returning such query results to the user). Preferably, Transaction Server 149 will send a Transactional Confirm 307 to the initiating ScatterOp 147 if at least one on instance of Singular database 119 reports commitment of a Transactional Request 157. Preferably, the Transaction Server 149 will only report the failure of Transactional Request 157 in the circumstance that no instance of Singular database 119 reported commitment of a Transactional Request 157.

Preferably, if the Write Command 301 was rolled back on say, Local Read/Write DB-2 127, Transaction Server 149 will record the failure of the Transactional Request 157 on Local Read/Write DB-2 127 in the Scatter Log 167 (herein embodying transmit such update outcome information to such at least one first computer processor; and herein embodying recognizing failure of such at least one instance of such at least two first database replicated instances to accept at least one such update request; and herein embodying recognizing a failure in at least one instance of such multiple database instances, and adjusting to store such transactional query for later propagation). Preferably, Transaction Server 149 will record any future Write Commands to Local Read/Write DB-2 127 in the Scatter Log 167 marking them also as failed and will not attempt to send them to Local Read/Write DB-2 127 until the database recovery process has successfully brought Local Read/Write DB-2 127 back into synchronization with the other instances of Singular database 119 (herein embodying controlling such transactional queries to maintain substantial identicalness among such multiple database instances).

Only a single transactional path is shown for clarity in FIG. 3, preferably as many instances of the ScatterOp 147 as necessary to meet Users 113 or 117 requirements may be actively requesting updates to any number of instances of Singular Database 119. Those skilled in the art will readily understand that the number of active processes is limited by the selected server hardware and operating system environment.

Figure 4:
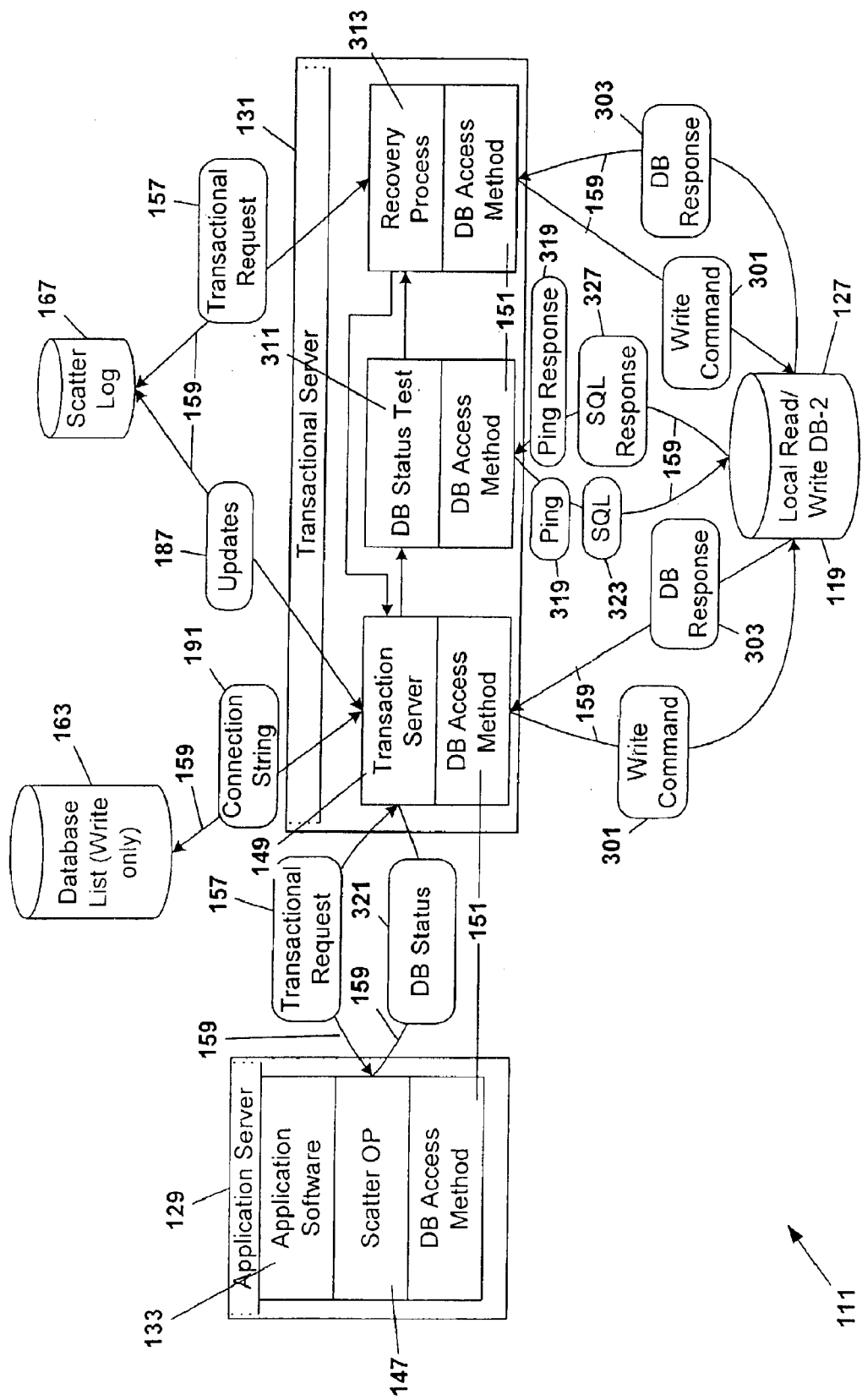
FIG. 4 is a simplified schematic illustration of the present invention processing recovery of a failed database according to a preferred embodiment.

Referring to FIG. 4, preferably the database recovery process essentially works independently of the Transaction Server 149, but in coordination with it to bring a failed instance of the Singular database 119 back in synchronization with all other instances. (Herein embodying restoring such failed at least one instance of such multiple database instances to substantial identicalness with other such multiple database instances.) Preferably, the Transaction Server 149 after detecting a failure in Local Read/Write DB-2 127 and noting it in the Scatter Log 167, as described above, will instantiate the process DB Status Test 311 which will test the availability of Local Read/Write DB-2 127 by establishing a TCP/IP connection 159 and send a Ping 319 to it (herein embodying initiate such at least one fourth computer processor; and herein embodying test presence of such at least one instance of at least two first database replicated instances not substantially identical to all other such instances of at least two first database replicated instances; and herein embodying testing for presence of such at least one instance of such at least two first database replicated instances not substantially identical to all other such instances of such at least two first database replicated instances). Preferably, DB Status Test 311 will continue to send Ping 319 until it receives a valid Ping Response 319. Preferably, receipt of a valid ping response 319 to indicate there is a valid TCP/IP connection to Local Read/Write DB-2 127. After DB Status Test 311 has determined that Local Read/Write Database 127 is connected to the network, preferably, it moves to next step of the process which is attempting to send the database SQL 323 command across the TCP/IP connection to Local Read/Write Database 127. Preferably, the nature of SQL 323 command is configurable through the administration program, but is preferably a non-modifying read operation. Preferably, this is necessary to ensure the database management server software is online or functioning properly because a valid TCP/IP connection does not the database is available for updates. Until a valid SQL Response 327 is received a valid response, preferably the database is assumed to be offline (herein embodying test readiness of such at least one instance of at least two first database replicated instances not substantially identical to all other such instances of at least two first database replicated instances to accept update requests; and herein embodying testing for readiness of such at least one instance of such at least two first database replicated instances not substantially identical to all other such instances of such at least two first database replicated instances to accept update requests). Preferably, once a valid SQL Response 323 is received, DB Status Test 311 will instantiate the Recovery Process 313. Preferably, the Recovery Process 313 brings each failed Local Read/Write Database up-to-date, by establishing a TCP/IP connection 159 with the Scatter Log 167 and requesting all transaction requests 157 that have occurred since Local Read/Write DB-2 127 failed beginning with the first Transaction Request 157 that failed (herein embodying retrieve at least one unprocessed update request for such at least one instance of at least two first database replicated instances not substantially identical to all other such instances of such at least two first database replicated instances from such at least one third database; and herein embodying retrieving at least one unprocessed update request for such at least one instance of such at least two first database replicated instances not substantially identical to all other such instances of such at least two first database replicated instances from such at least one third database). Preferably, Recovery Process 313 also establishes a TCP/IP connection 159 to Local Read/Write DDB-2 127. Proper handshaking confirms the connection and the write command 301 is provided by Recovery Process 313 to Local Read/Write DB-2 127. In accordance with proper database policies and procedures as required by the underlying database to which the present invention is applied, the write command 301 is appropriately committed as evidenced by a DB Response 303 sent back to Recovery Process 313 by Local Read/Write DB-2 127 (herein embodying receive such update outcome information for each unprocessed such update request transmitted to each such instance of such at least two first database replicated instances not substantially identical to all other such instances of such at least two first database replicated instances). Preferably, Recovery Process 313 continues to update Scatter Log 167 based on DB Response 303 (herein embodying add such update outcome information to each such update request on such at least one third database; and herein embodying receiving such update outcome information for each unprocessed such update request transmitted to each such instance of such at least two first database replicated instances not substantially identical to all other such instances of such at least two first database replicated instances; and herein embodying adding such update outcome information to each such update request on such at least one third database). Preferably, Recovery Process 313 continues the recovery cycle until a preset threshold of remaining Transaction Requests 157 remains. Preferably, during the recovery of Local Read/Write DB-2 127, Local Read/Write DB-2 127 preferably remains marked as offline (herein embodying transmit at least one unprocessed such update request to such at least one instance of at least two first database replicated instances not substantially identical to all other such instances of such at least two first database replicated instances; and herein embodying transmitting at least one unprocessed such update request to such at least one instance of such at least two first database replicated instances not substantially identical to all other such instances of such at least two first database replicated instances). Preferably, any additional Transaction Requests 157 that occur during the recovery process continue to be added to the Scatter Log 167 as they normally would be, but marked as not written to Local Read/Write DB-2 127.

Preferably, when the Recovery Process 313 nears completion as set by a preset threshold of remaining Transaction Requests 157, the Recovery Process 313 preferably signals the Transaction Server 149 to suspend accepting any new Transaction Requests 157. Preferably, Transaction Server 149 ceases to acknowledge receipt of new Transaction Requests 157, which causes ScatterOp 147 to wait without reporting an error. Preferably, all currently pending Transaction Requests 157 are completed (whether a commit or rollback) for all other instances of Singular database 119, before suspending acceptance of new Transaction Requests 157 and completing the last remaining updates to the Local Read/Write DB-2 127 and reinstating it into service. Preferably, the preset threshold of remaining updates is configurable by the database administrator.

Preferably, when the Local Read/Write DB-2 127 is completely up to date, the Recovery Process 313 signals the Transaction Server 149 to pause processing new incoming Transaction Requests 157 until the last Transaction Request 157 from the Scatter Log 167 can be processed on Local Read/Write DB-2 by the Recovery Process 313 (herein embodying manage transmission of all such unprocessed update requests until completion; and herein embodying transmit completion progress information to such at least one second computer processor; and herein embodying receive such completion progress information from such fourth computer processor; and herein embodying suspend receiving such at least one update request from such at least one first computer processor when such completion progress information reaches a preset value; and herein embodying restoring at least one instance of such at least two first database replicated instances not substantially identical to all other such instances of at least two first database replicated instances to substantial identicalness with all other such instances of such at least two first database replicated instances; and herein embodying suspending receiving such at least one update request when such completion progress information reaches at least one preset value; and herein embodying managing transmission of all such unprocessed update requests until completion). Preferably, this ensures that no new Transaction Requests 157 can begin until Local Read/Write DB-2 127 has been marked as available and ready to process new Transaction Requests 157 in real-time along with the other online instances of Singular database 119 (herein embodying resume receiving such at least one update request from such at least one first computer processor when such completion progress indicates all unprocessed such updates have been applied; and herein embodying resuming receiving such at least one update request when such completion progress indicates all unprocessed such updates have been processed). Preferably, when Local Read/Write DB-2 127 is marked as available in the Scatter Log 167, the Recovery Process 313 signals the Transaction Server 149 which, in turn, notifies all existing ScatterOp 147 that Local Read/Write DB-2 is again available to the ScatterOp 147 for any non-transactional operations (herein embodying transmit notification that such at least one such instance of such at least two first database replicated instances is substantially identical to all other such instances of such at least two first database replicated instances to at least one such first computer processor).

Only a single recovery path is shown for clarity in FIG. 4, preferably, as many instances of the DB Status Test 311 and Recovery Process 313 as necessary may be actively restoring failed instances of Singular Database 119. Those skilled in the art will readily understand that the number of active processes is limited by the selected server hardware and operating system environment.

Figure 5:
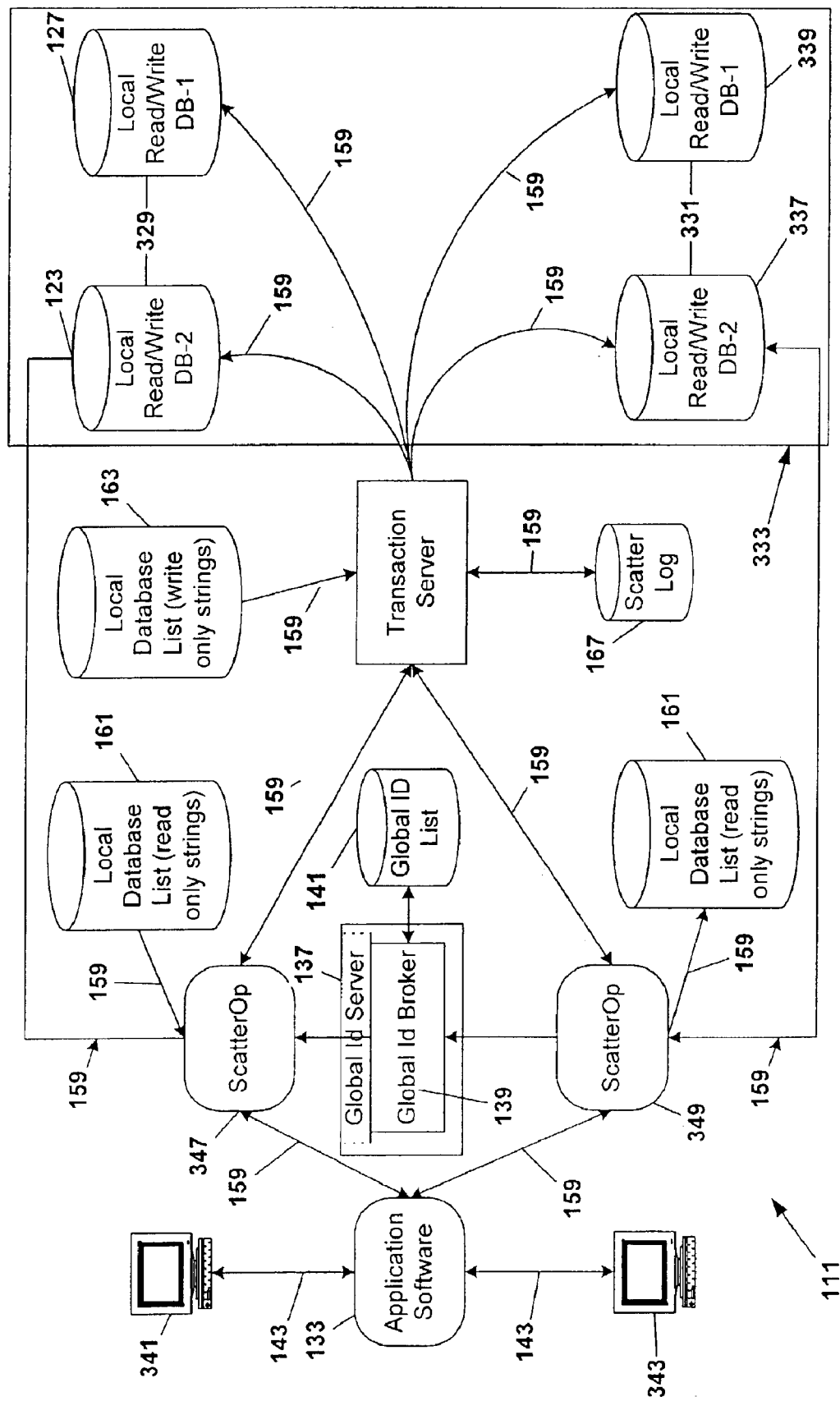
FIG. 5 is a simplified schematic illustration of the present invention depicting the use of multiple scatter sets within a database cluster according to a preferred embodiment.

Referring to FIG. 5, as shown in a simplified schematic, under appropriate circumstances, it is permissible to provide User 113 access to Scatter Set 331 and User 117 access to Scatter Set 333. A preferred embodiment of the present invention provides the capability to manage differing sets of Local Read/Write Databases organized into Scatter Set 329 and 331. Preferably, Scatter Set 329 contains one or more instances of Local Read/Write Databases, such as Local Read/Write DB-1 127 and Local Read/Write DB-2 129, while Scatter Set 331 contains one or more instances of Local Read/Write Databases, such as Local Read/Write DB-5 337 and Local Read/Write DB-6 339. Preferably, each scatter set is a group of unique databases within cluster 333, for example, the data contained in Local Read/Write Database 127 and 129 in Scatter Set 329 is managed separately from the data contained in Local Read/Write Database 337 and 339 in Scatter Set 331. Preferably, all instances of Local Read/Write Databases, regardless of Scatter Set, in the Database Cluster 333 have the exact same schema, and can be managed by the same Transaction Server 149 and Global ID Broker 139 all operating within the same Application Software 133. Preferably, the Global ID Broker 139, issues unique primary keys for each Scatter Set 327 and 331.

Under appropriate circumstances, according to a preferred embodiment of the present invention, different client's data can be maintained separately, and the client's hardware and storage environment can be optimized to meet their particular needs. Preferably, each client is assigned a unique Customer ID which is used by the Application Software 133, ScatterOp 147 and the Transaction Server 149 to route database commands to the appropriate Scatter Set 329 or Scatter Set 331.

As shown in FIG. 5, Customer 1 341 may issue a database command to read or update Local Read/Write DB-1 127 and DB-2 129 in Scatter Set 329. The Application Software 133 transfers the database command from Customer 1 341 along with the Customer Id to ScatterOp 347 which will, depending on the nature of the database command request and the data from Local Read/Write DB-1 127 or transfer the database request to the Transaction Server 149 to be written to Local Read/Write DB-1 127 and Local Read/Write DB-2 129 in Scatter Set 329.

Preferably, the same processes take place for Customer 2 343, except the database commands are directed to Local Read/Write DB-5 337 and Local Read/Write DB-6 339 because the Customer ID for Customer 2 is associated with Scatter Set 321, which contains Local Read/Write DB-5 337 and Local Read/Write DB-6 339.

Preferably, the Customer ID and the associated Scatter Set are administratively assigned.

Alternate Preferred Embodiment

Hardware Overview

With the intention of enabling an alternate preferred embodiment of the present invention the following description is subdivided to provide an overview of the eight primary components giving rise to an alternate preferred embodiment of the present invention. The eight primary components are the Scattering Service, ScatterOp, Write-Only Queue, Failed Queue, Ticketing System, Global ID Broker, Distributed Semaphore and Administration System.

Within each subsection of description reference is made by title to other system components when and as necessary to assist in understanding system inter-relationships.

Scattering Service

An alternate preferred embodiment of the present invention provides for allocation of resource needs and data access across a plurality of server databases. To achieve this, there is preferably a centralized repository of information relating to the status of the scattered database system itself, i.e., the status of each database instance.

This centralized repository, as described herein, comprises the Scattering Service, an extremely lightweight application preferably existing on its own ultra-fast hardware system. Preferably, the Scattering Service is connected solely by TCP/IP to the rest of the system embodying the present invention. Preferably, as connection to the system is by TCP/IP only, it is a connection channel established with sufficient bandwidth to accommodate the predicted level of traffic. Under appropriate circumstances, it may be desired to maintain multiple high-bandwidth connection paths with a plurality of unrelated providers such that a failure in one provider's network will not significantly impede operation of the present invention. Under appropriate circumstances, the Scattering Service may be placed within the same local network environment of the Read/Write Databases and "ScatterOp(s)" (web based interface objects discussed in detail in the following section hereof), thereby enjoying increased TCP/IP connectivity and bandwidth resources without additional costs to access providers.

Further, the Scattering Service is preferably a fast, configurable socket server operating in a multithreaded capacity to concurrently receive, process and answer all incoming requests and status reports. All data transfer to and from the Scattering Service is preferably performed in XML grammar.

Preferably, the Scattering Service maintains current data records on the status of each Local Read/Write Database and each remote Write-Only Database. Preferably, the Scattering Service is the sole entity responsible for maintaining a listing of the required connection strings and host names for the local and remote systems.

The Scattering Service achieves a preferred level of system resource allocation by assigning requests for database "read" (non-transactional) access in a round robin style of processing. More specifically, in response to the first request by a ScatterOp for a database connection string, the Scattering Service will preferably return the address for Local Read/Write Database "n". The second request received by the Scattering Service from a ScatterOp for a database connection string will be preferably answered with the connection string for Read/Write Database "n+1". Subsequent requests will continue to increment through the universe of available databases until all have been assigned, at which time the cycle will reset and begin from the initial "n" database. In such round robin fashion, identical instances of the database are capable of substantially simultaneous parallel access and use by multiple client users. Under appropriate circumstances, it may be desirable for users of the system to modify the iterative round robin assignment process to permit greater time for an operation to complete (as in one database instance) before recognizing its subsequent assignment iteration.

Preferably, requests for connection strings involving "write" (transactional) operations are not handled in the round robin manner set for "parallel" processing of read operations. Specifically, functionality of a database system incorporating the present invention is achieved by insuring uniform symmetry of data throughout all Read/Write Databases. To achieve and maintain such uniform symmetry, i.e., uniformity, the Scattering Service must direct each and every write operation performed by a ScatterOp to all Local Read/Write Databases, before a subsequent write operation may be performed. For a transactional operation, such as write, the Scattering Service will provide to the ScatterOp the connection strings for all of the known and operational Read/Write Databases, as well as the connection strings to the Write-Only Queues (discussed supra) for synchronization of the remote Write-Only Databases. Preferably, the connection strings for the Local Read/Write Databases and Write-Only Queues are returned en masse as an array by the Scattering Service to the ScatterOp. Such a complete response is preferable as it permits the Scattering Service to operate without maintaining record of state, each thread having a defined beginning starting with the request for connection strings and ending with the delivery of the array of requested connection strings.

It is to be noted that for each instance of a Local Read/Write Database present in the system, there are preferably at least two associated connection string records. The first is for the Read/Write Database itself. The second is for the Failed Queue (discussed supra) associated with the Read/Write Database. In the event that the ScatterOp fails to connect to the Read/Write Database, it will attempt connection to the associated Failed Queue. Preferably, should the ScatterOp connect to the Failed Queue, the ScatterOp will inform the Scattering Service that connection to the Failed Queue was required. Until the Failed Queue informs the Scattering Service that the Read/Write Database has returned to on-line status the Scattering Service will provide only the Failed Queue connection string for the associated failing Read/Write Database when a transactional operation connection is to be performed upon the universe of Read/Write Databases. Preferably, in response to a request for a non-transactional connection string the Scattering Service will not provide a connection string to a Read/Write Database currently having transactional SQL statements directed to its Failed Queue. Under appropriate circumstances, it may be desirable to expand this methodology and permit multiple instances of Failed Queues for a highly critical Read/Write Database. Such a configuration may be implemented by permitting the Scattering Service to provide additional connection strings for successive Failed Queues.

Restructuring of any data maintained by the Scattering Service, not achieved automatically through normal operation of the automated components of the system, is preferably to be performed by means of an administration application program. Such restructuring of data is understood to include, but is not necessarily limited to, the administrative tasks of updating the Scattering Service's awareness of available Read/Write Databases and Write-Only Databases.

Summarizing, there is only one instance of the Scattering Service and that instance is not required to maintain state. The relationship of communication involving the Scattering Service is as follows:

| Talks to | Hears From |
| --- | --- |
| ScatterOp | ScatterOp |
| Provides requested Local Read/Write DB connection string | Request for Local Read/Write DB connection string |
| Provides requested hostname for Local Read/Write database | Request for Local Read/Write DB hostname |

-continued

| Talks to | Hears From |
| --- | --- |
| Provides requested failed queue hostnames | Request for failed queue hostname |
| Provides requested Write-Only queue hostnames | Request for Write-Only queue hostnames |
| | Provides status of Local Read/Write DB as offline |
| | Provides status of a failed queue as offline |
| | Provides status of Write-Only queue |
| | Failed Queue Service |
| | Provides status of failed Read/Write DB as back online |

ScatterOp

The ScatterOp is the preferred point of contact for all client users of the present invention. By intention, the ScatterOp according to the present invention is intended to act as middle-ware, improving the performance characteristics of a database without requiring specific modification for platform-specific database applications. To achieve this preferred ability, it is preferred that users of the system have a primary point of contact for passing and receiving query requests to and from the database system as well as for providing write commands to the database system.

As taught under an alternate preferred embodiment of the present invention, the ScatterOp is a web based interface object interfacing directly with client users to receive their requests and interacting as directed by the Scattering Service with all database components of the scattered database scattered set. Preferably, all communications with client users of the system are conducted by means of TCP/IP, and more specifically HTTP, HTTPS and SOAP. Preferably, all communications internal to the system between the ScatterOp and the other defined components are conducted by means of TCP/IP, and more specifically, HTTP, HTTPS and SOAP. Additional interaction protocols necessary to maintain, pass and parse XML grammar to propagate and perform the requisite SQL statements will become apparent to those skilled in the art and may be incorporated under appropriate circumstances without departing from the teachings of the present invention.

Receiving the SQL statements from the client user, the ScatterOp is responsible for performing all local read and write operations upon the Local Read/Write Databases and marshalling the SQL statements directing write operations to the remote Write-Only Databases. To achieve this, the ScatterOp preferably must support, at a minimum, the fundamental database commands recognizable to those skilled in the art, e.g., ExecuteGet, ExecuteGetScalar, ExecuteNonQuery, and ExecuteInsert. Further, the ScatterOp will preferably support, at a minimum, the minimum database interaction commands, e.g., Begin Transaction, Commit Transaction, and Rollback Transaction. These interaction commands serve to direct the database to begin the requested operation, effectively commit the changes of the requested transaction, and reverse and do not commit the changes of the requested transaction.

More specifically, client users of the database system incorporating an alternate preferred embodiment of the present invention must transparently interact with the ScatterOp in place of the standard data transport mechanisms (such as, but not limited, to ADO, ODBC, and JDBC). Access to an actual database component is only achieved by means of the ScatterOp, and any attempt to connect to a scattered database component without the involvement of the ScatterOp is preferably not permitted, as such unregulated access, especially if write access, may result in non-synchronous copies of the database elements. Under appropriate circumstances and with appropriate safeguards, external read-only access may be desired upon a remote Write-Only Database. Such access and use may be desired to minimize placement of system-intensive queries, such as content and index queries, upon the primary Read/Write Databases for specific instances of read data access requirements.

Scalability is preferably achieved by enabling an alternate preferred embodiment of the present invention to operate with a plurality of ScatterOp objects, each ScatterOp instance being instantiated upon the connection of a client user, and each ScatterOp instance operating in relative autonomy from other ScatterOp instances while completing all operations as directed by the client users' provided SQL statements. Proper synchronization between the Read/Write Databases when performing transactional operations is achieved through the use of semaphores.

As taught under the present invention, the location of the hardware supporting the ScatterOps is a matter of individual choice, preferably dictated by desired system performance and the perceived requirements of the system. As server generated objects, ScatterOps may be provided from the same physical system upon which a Local Read/Write Database may be located or upon a physically separate system (dedicated to serving ScatterOps or providing additional related or unrelated system services). Preferably, in either case, interaction with the Local Read/Write Databases and non-local Write-Only Databases is maintained by TCP/IP. It is noted that in instances where ScatterOps are served from physically different systems, the Distributed Semaphore discussed below is utilized to further enhance synchronization capabilities.

The proper operation of a database is predicated upon a system of primary keys (defined above) used for the organization and location of data records. Where a copy of a database is made, a copy of the primary keys will occur naturally. When dealing with a live database and subsequent live duplicate copies of the database, it is important that the primary key system be uniform among all instances of the database. More specifically, it is important that a new data record added to the database, for example "John Smith," be added with the same primary key, for example "28088020274," in all instances of the database such that later operations upon the record may be performed with but one reference to the primary key. To achieve such synchronization under the present invention, the ScatterOps will obtain primary keys when and as necessary from the Global ID Broker, discussed more completely below.

With respect to transactional operations, each ScatterOp must maintain an array of database connections, and the status of those connections, as the write command is propagated to the Local Read/Write Databases. When complete, the ScatterOp must command each of the involved Local Read/Write Databases to either commit or rollback the transaction.

Preferably, should a Local Read/Write Database fail to respond to the connection string provided for a transactional operation or the communication of the transactional SQL statement itself, the ScatterOp will record the identity of the failing Read/Write Database and the SQL statement in a local memory array serving as a pre-failed queue for an additional attempt during the same transaction session. During the transaction process with the other Local Read/

Write Databases, the ScatterOp will preferably make at least one additional attempt to establish a connection and transfer the SQL statement to the Local Read/Write Database noted in the pre-failed memory queue. If a connection and transfer of the command is successful, the SQL statement is removed from the pre-failed memory queue. If the transaction statement is rolled back, it is preferably flushed from the pre-failed memory queue of the ScatterOp as well. Upon completion of a committed write transaction with the remaining Local Read/Write Databases, any remaining SQL statements in the ScatterOp's pre-failed memory queue are written to the Failed Queue for the apparently offline Local Read/Write Database.

Preferably, upon redirection of SQL statements to a Failed Queue, the ScatterOp will inform the Scattering Service that additional transactional directives for the failing Read/Write Database should be communicated to the corresponding Failed Queue. Such ordering of preference is preferably maintained by adjusting the preference values held by the Scattering Service for the indicated set of the Failed Queue and Local Read/Write Database.

Distinction between a Failed Queue and a Local Read/Write Database is preferably not required by the ScatterOp. Preferably, so long as the ScatterOp is successful in communicating the transactional SQL statements to either the Local Read/Write Database or the Failed Queue, the operation is considered a success. In the event that the ScatterOp fails to communicate with the Failed Queue, the ScatterOp must preferably report such failure to the Scattering Service. Preferably, the Scattering Service will respond to this second notice of failure as an indication that the Local Read/Write Database is effectively offline and no further communications of any sort should be directed to it until it is reset and re-sequenced by a system administrator.

Maintaining the SQL statement in memory is preferable as well with respect to the remote Write-Only Queue. For simplicity of design and ease of system resources and connectivity, the SQL statement is preferably marshaled to Scattering-Service-indicated Write-Only Queues only upon confirmation from the Local Read/Write Databases that the statement was committed. As SQL statements that were rolled back were by definition not committed, there is no need for the ScatterOp to marshal these unnecessary commands to the remote Write-Only Queues.

It should be noted that by intentional design of TCP/IP, communications directed to the Write-Only Queues may not always arrive in the precise sequence in which they were sent. Therefore, preferably, the ScatterOp makes use of the Ticketing System (described in further detail below) to provide a unique sequence identifier to each SQL statement transmitted to the Write-Only Queues by the ScatterOp, thus insuring that the write directives occur in the proper sequence.

In the event that the ScatterOp fails to receive confirmation from either a Write-Only Queue or a Failed Queue that a transmitted SQL statement has been received, the ScatterOp will inform the Scattering Service that the non-responding Write-Only Queue or Failed Queue is off line and thus the associated remote Write-Only Database or Local Read/Write Database should be considered offline until restored by a system administrator.

Due to the nature of communication over the Internet, it is recognized that connection between the ScatterOp and the Failed Queues and Write-Only Queues is not infallible. It is therefore preferred under the present invention to permit the system administrator to define a timeout variable. If a connection to a component cannot be obtained within the defined timeout period, the connection attempt will be deemed a failure and the system will advance in accordance with its design parameters. Specifically, in most cases such breach of a timeout period will result in the ScatterOp informing the Scattering Service that the Read/Write Database or Write-Only Queue is effectively off line, a condition that will require the attention of the system database administrator.

Summarizing, there are preferably a plurality of ScatterOps, each of which is state aware. The relationship of communication involving the ScatterOp is as follows:

| Talks to | Hears From |
|---|---|
| User | User |
| Provides data requested for Read operation SQL | Provides Read operation SQL |
| Provides confirmation of Write operation SQL | Provides transactional Write operation SQL |
| | Provides non-transactional Write operation SQL |
| Scattering Service | Scattering Service |
| Request for Local Read/Write DB connection string | Provides requested Local Read/Write DB connection string |
| Request for Local Read/Write DB hostname | Provides requested hostname for Local Read/Write DB |
| Request for failed queue hostname | Provides requested failed queue hostnames |
| Request for Write-Only Queue hostnames | Provides requested Write-Only Queue hostnames |
| Provides status of Local Read/Write DB as offline | |
| Provides status of a Failed Queue as offline | |
| Provides status of Write-Only Queue | |
| Local Read/Write Database (DB) | Local Read/Write Database (DB) |
| Provides SQL to query Read | Provides data requested for Read operation SQL |
| Provides SQL to execute Write | Provides confirmation of Write operation SQL |
| | Provides error confirming Write operation SQL failed |
| Failed Queue | Failed Queue |
| Provides SQL for future Write | Provides confirmation of SQL statement stored |
| Write-Only Queue | Write-Only Queue |
| Provides SQL for future Write | Provides confirmation of SQL statement stored |

Write-Only Queue

It is a requirement of the alternate preferred embodiment of the present invention to maintain and achieve synchronized, redundant copies of the Local Read/Write Database(s) in non-local environments as Write-Only databases. Persons skilled in the art of computer information storage and retrieval will appreciate the benefit and common practice of maintaining current, non-localized backup copies permitting restoration of the database and access services should the local copies fail for a variety of reasons such as localized power failure, physical disruption of the local network due to human error, and natural phenomena such as earthquakes and storms to name but a few causes. Under appropriate circumstances, it may be desirable to have what is otherwise qualified as a remote Write-Only Database actually locally available; however, the methods of interaction and operation would remain unchanged.

Under the teachings of the present invention, each mirrored database within a given embodiment of the present invention must receive and properly process the transactional commands directed to the database as a whole. More specifically, the write commands issued by a user utilizing a database system operating under the present invention are directed to the database as an undivided whole. Within an alternate preferred embodiment of the system, the transactional commands must be properly synchronized across all copies of the Local Read/Write Databases as well as the remote Write-Only Databases.

To facilitated synchronization of the remote Write-Only Databases, preferably the system utilizes a Write-Only Queue. In an alternate preferred embodiment of the present invention, the Write-Only Queue is a web-based service that is used to collect the SQL statements that are to be written to the non-local Write-Only Database. The SQL statements are preferably collected and processed on a substantially sequential First-In First-Out basis, thus insuring proper synchronization of the remote Write-Only Databases. It should be noted that the First-In designation is based upon a time sequence value supplied by the Ticketing System to the ScatterOp and affixed to the SQL statement. Thus, the preferred operational order of execution of SQL statements as delivered by the Write-Only Queue to the Write-Only Database is First in Time, not necessarily first in arrival at the Write-Only Queue.

Preferably, an SQL statement is delivered to the Write-Only Queue by the ScatterOp only after the ScatterOp has confirmed the transactional SQL statement upon the Local Read/Write Databases and has conclusively determined that the SQL statement is to be written to the Local Read/Write Databases. Such prior confirmation before directing the SQL statement to the Write-Only Queue is preferable as it serves to reduce system load by removing superfluous operations.

By receiving the SQL statements from the ScatterOp only after a confirmed write to the Local Read/Write Databases, the Write-Only Queue is permitted to operate without state. More specifically, it is a simple process operating to direct the currently-queued SQL statements to each remote Write-Only Database and moving to the next queued statement only after receiving confirmation of successful execution of the SQL statement. Should a Write-Only Database fail to confirm successful commitment of the SQL statement, the preferred Write-Only Queue will record the failed SQL statement and operate as a failed queue for the remote Write-Only Database until such time as the remote Write-Only Database returns, retrieves and properly commits all of the queued SQL statements or the Write-Only Queue is unable to store further SQL statements in its operation as a failed queue.

As taught under the present invention, there is preferably a one-to-one relationship of Write-Only Queues per each remote Write-Only Database. Preferably, for improved system performance and operability, the component set of Write-Only Queue and Write-Only Database systems are physically located upon different machines, proximately located to one another on a remote LAN. Under appropriate circumstances, it may be desired to co-locate the Write-Only Queue and Write-Only Database upon the same physical system; however physical separation is generally preferred as it permits generalized maintenance upon the Write-Only Database without informing the Scattering Service that the Write-Only Database is off line.

With respect to the Write-Only Queue, and preferably each instance thereof, the Write-Only Queue may be described as being comprised of two halves—a client side which interacts with the ScatterOps and a server side which interacts only with the Write-Only Database.

The client side of the Write-Only Queue is preferably a SOAP web service preferably established to interact with the ScatterOps via the Internet, preferably by means of HTTPS and SOAP, to receive and confirm receipt of preferably any and all types of SQL statements as provided by the ScatterOps. The received SQL statements are written to an appropriately constructed XML queue file maintained on the server side of the Write-Only Queue. It should be noted that, by intentional design of TCP/IP, communications received from ScatterOps may not always arrive in the precise sequence in which they were sent. Therefore, as described further below, preferably the ScatterOp makes use of the Ticketing System to provide a unique sequence identifier to each SQL statement transmitted.

Received SQL statements are ordered by the Write-Only Queue in the XML queue by the sequence identifier provided by the Ticketing System such that the SQL commands are properly executed in sequence according to the time of their origination. Upon confirmation of execution of an SQL statement, the Write-Only Queue preferably removes it from the XML queue.

Summarizing, Write-Only Queues exist in a one-to-one relationship with each Write-Only Database provided in a preferred embodiment. Write-Only Queues do not require awareness of state. The relationship of communication involving the Write-Only Queue is as follows:

| Talks to | Hears From |
| --- | --- |
| ScatterOp | ScatterOp |
| Provides confirmation of SQL statement stored | Provides SQL statement for future Write |
| Write-Only Database | Write-Only Database |
| Provides SQL statement for Write | Provides confirmation of SQL statement Written |

Failed Queue

Functionality of the alternate preferred embodiment of the present invention is predicated upon the ability to maintain synchronized redundant copies of databases for the purpose of achieving substantially parallel processing of client user operations.

In an alternate preferred embodiment of the present invention, there are preferred pluralities of Local Read/Write Databases available for performing transactional operations. Under the teachings of the present invention, each mirrored copy of the Local Read/Write Database must receive and properly process the transaction commands directed to the database system by the client user. In the event that a Local Read/Write Database should fail or be taken off line for maintenance or such other operation as desired by the database administrator, the present invention teaches the implementation of a Failed Queue to temporarily collect and hold the SQL statements for later automated processing upon the Local Read/Write Database.

In an alternate preferred embodiment of the present invention, the Failed Queue is a web-based service that is used to collect the SQL statements that are to be written to a Read/Write Database. The SQL statements are preferably collected and processed on a substantially sequential First-In First-Out basis, thus insuring proper synchronization of the remote Write-Only databases. It should be noted that the "First-In" designation is based upon a time sequence value supplied by the Ticketing System to the ScatterOp and affixed to the SQL statement. Thus, the preferred operational order of execution of SQL statements as delivered by the Failed Queue to the Read/Write Database is First in Time, not necessarily first in arrival at the Failed Queue. Preferably, an SQL statement is delivered to the Failed Queue by the ScatterOp only after the ScatterOp has confirmed the transactional SQL statement upon the remaining Local Read/Write Databases. Such prior confirmation before directing the SQL statement to the Write-Only Queue is preferable as it serves to reduce system load by removing superfluous operations.

By receiving the SQL statements from the ScatterOp only after a confirmed write to the remaining Local Read/Write Databases, the Failed Queue is permitted to operate without state. More specifically, it is a simple process operating to direct the currently queued SQL statements to each remote Read/Write Database and moving to the next queued statement only after receiving confirmation of successful execution of the SQL statement.

As taught under the alternate preferred embodiment of the present invention, there is preferably a one-to-one relationship of Failed Queue per each Local Read/Write-Only Database. Preferably, for improved system performance and operability, the component set of Failed Queue and Read/Write Database systems are physically located upon different machines, proximately located to one another on the LAN. Under appropriate circumstances, it may be desired to co-locate the Write-Only Queue and Write-Only Database upon the same physical system; however, such co-location is not preferred as a failure of the Read/Write Database system will likely result in a failure of the Failed Queue and thus defeats the preferred operation of the Failed Queue.

With respect to the Failed Queue, and preferably each instance thereof, the Failed Queue may be described as being comprised of two halves—a client side which interacts with the ScatterOp and a server side which interacts only with the Read/Write-Database and Scattering Server. The client side of the Failed Queue is preferably a SOAP web service preferably established to interact with the ScatterOps via the Internet, preferably by means of HTTPS and SOAP, to receive and confirm receipt of preferably any and all types of SQL statements as provided by the ScatterOps. The received SQL statements are written to an appropriately constructed XML queue file maintained on the server side of the Failed Queue. It should be noted that by intentional design of TCP/IP, communications received from ScatterOps may not always arrive in the precise sequence in which they were sent. Therefore, as described further below, preferably the ScatterOp makes use of the Ticketing System to provide a unique sequence identifier to each SQL statement transmitted. Received SQL statements are ordered by the Failed Queue in the XML queue by the sequence identifier provided by the Ticketing System such that the SQL commands are properly executed in sequence according to the time of their origination.

As the Failed Queue is utilized when the Read/Write Database is apparently offline, the Failed Queue preferably "pings" the Read/Write Database to determine when it is available to receive the stored SQL Statements. In a traditional sense, a "ping" is simply a network tool capable of detecting the operating presence of a system with an IP address upon the network. Because a server may respond to a ping while the database application itself may be down, hung, or otherwise non-responsive, the concept of a ping as used herein is extrapolated beyond simply confirming the presence of a responsive hardware system. More specifically, the ping test as taught under the present invention is preferably designed so that it permits both verification that the physical system is available and that the database system is operational.

In operation, the Failed Queue pings the Read/Write Database at a regular interval defined by the database administrator. Upon a successful ping that the Read/Write Database is available the stored SQL statements are executed in their sequenced order. Upon confirmation of execution of an SQL statement, the Failed Queue preferably removes it from the XML queue. Upon successful execution of all SQL statements held in the XML queue, the Failed Queue preferably directs a HTTPS communication to the Scattering Service, informing the Scattering Service that the Read/Write Database is available to resume operation with respect to both transactional and non-transactional operations.

Summarizing, Failed Queues exist in a one to one relationship with each Read/Write Database provided in a preferred embodiment. Failed Queues do not require awareness of state. The relationship of communication involving the Failed Queue is as follows:

| Talks to | Hears From |
|---|---|
| ScatterOp | ScatterOp |
| Provides confirmation of SQL statement stored | Provides SQL statement for future Write |
| Local Read/Write Database (DB) PING to determine availability | Local Read/Write Database (DB) Response to PING when available |
| Provides SQL to execute Write when available | Provides confirmation of SQL Write |
| Scattering Service Provides status of failed Read/Write DB as back online | |

Ticketing System

By specific intention and architectural design, the pathway of delivery for one TCP/IP packet may, and often is, different from another TCP/IP packet. Packets comprising a transmission may arrive out of order, requiring re-sequencing on the part of the recipient. Indeed, transmissions themselves may arrive out of sequence from when they were originally sent.

The structure and function of the scattered database system enabled by the present invention is reliant upon preferred multiple instances of the database being in substantial unified harmony with one another. Preferably, the synchronization of databases instances may be easily achieved through the use of a preferred Ticketing System. Preferably, existing as a web-based service, the Ticketing System preferably will provide each requesting ScatterOp with a unique sequence value, preferably a time-coded sequence value which will, in turn, be used by the ScatterOp to properly sequence all write-directive SQL statements to the Write-Only Queues. Further, as the Ticketing System is simply required to provide a sequence value in sequence, the Ticketing System need not be state aware. As the sequence values may be quite large, the preferred Ticketing System is preferably not restricted by format to a value of a particular size.

It is to be recognized that because all transactional commands must be executed in sequential order to insure integrity of the data, there is preferably only one Ticketing System operational at any time within an embodiment of the present invention. Under appropriate circumstances, backup Ticketing Systems may be maintained; however those skilled in the art will appreciate that implementation of such a backup Ticketing Systems will preferably require additional safeguards to insure that proper sequencing is not lost during a handoff from the primary Ticketing System to a Backup Ticketing System.

Summarizing, there is preferably only one instance of the Ticketing System in operation at any time and that instance is not required to maintain state. The relationship of communication involving the Ticketing System is as follows:

| Talks to | Hears From |
|---|---|
| ScatterOp<br>Provides semaphore ticket | ScatterOp<br>Request for semaphore ticket |

Global ID Broker

The traditional purpose of a database is to organize data such that it may be used and or modified at some future time. It is therefore critical that some standard of organization be employed. Most commonly, database systems, especially relational database systems, employ an organizational system based upon primary keys. Under an alternate preferred embodiment of the present invention, multiple instances of the same database will require updates at substantially the same time. As each database instance is preferably an indistinguishable copy of every other database instance, it is of substantial importance that the primary keys used for the insertion of data be uniform across all Read/Write Database and Read-Only Database instantiations. More specifically, it is important that a new data record added to the database, for example "John Smith," be added with the same primary key, for example "28088020274," in all instances of the database such that later operations upon the record may be performed with but one reference to the primary key. Preferably, to achieve such synchronization under the present invention, a web-based Global ID Broker is provided which is accessible to the ScatterOps and provides primary keys when and as necessary. It is noted that, because uniform key sequence must be maintained, there is preferably only one Global ID Broker in operation within an alternate preferred embodiment of the present invention at any given time.

In accordance with the web-based communication and XML grammar harmony used under the present invention, each new primary key value provided and each primary key itself is preferably maintained as XML records, preferably date and time stamped. Persons skilled in the art will appreciate that primary keys may be modified and updated from time to time. Accordingly, in the distributed setting taught by the present invention, a semaphore synchronization scheme is employed to insure that no primary key is inappropriately modified more than once for any instance of its applied use.

Summarizing, there is preferably only one instance of the Global ID Broker in operation at any time and that instance is not required to maintain state. The relationship of communication involving the Global ID Broker is as follows:

| Talks to | Hears From |
|---|---|
| ScatterOp<br>Provides primary key | ScatterOp<br>Request for primary key |

Distributed Semaphore

Under appropriate circumstances involving ScatterOp objects that are running concurrently on multiple servers, it is preferable to centralize the operation of providing semaphores for maintaining synchronization. Preferably, the Distributed Semaphore is a web-based object provided to the ScatterOps by a dedicated system. Due to the importance of synchronization, it is preferable that the system hosting the Distributed Semaphore be an ultra-fast socket server responding to ScatterOp requests as parallel processing threads. All communications with the ScatterOps are preferably in HTTPS and the provided semaphore strings comply with the XML grammar.

It shall be noted that, as uniform semaphore distribution must be maintained, there is preferably only one Distributed Semaphore server in operation within an alternate preferred embodiment of the present invention at any given time. Summarizing, there is preferably only one instance of the Distributed Semaphore in operation at any time and that instance is not required to maintain state. The relationship of communication involving the Distributed Semaphore is as follows:

| Talks to | Hears From |
|---|---|
| ScatterOp<br>Provides semaphore | ScatterOp<br>Request for semaphore |

Administration System

Those skilled in the art of database maintenance and management will appreciate that an Administration System will be useful to permit the information within the Scattering Service to be updated and corrected as may be required with the addition or deletion of new or restored Read/Write Database and Write-Only Database systems.

The precise nature of the Administration System may be appropriately designed and modified, etc., depending upon the nature of the database to which the present invention is applied; however, it is preferred that this system provide administrators with a centralized web-based utility permitting modification of all records within the Scattering Service without requiring manual editing of the XML files. Preferably, the Administration System will provide the system administrator with a repertoire of system resources and tools to test and confirm operability of all system components.

As an alternate preferred embodiment of the present invention, as at least one feature thereof, is intended to serve as middleware between the client user and a database without concern to the operating system supporting the database, the Administration System will preferably provide user-configurable command statements that will be relied upon by an alternate preferred embodiment of the present invention for proper operation.

Operation Overview

Figure 6:
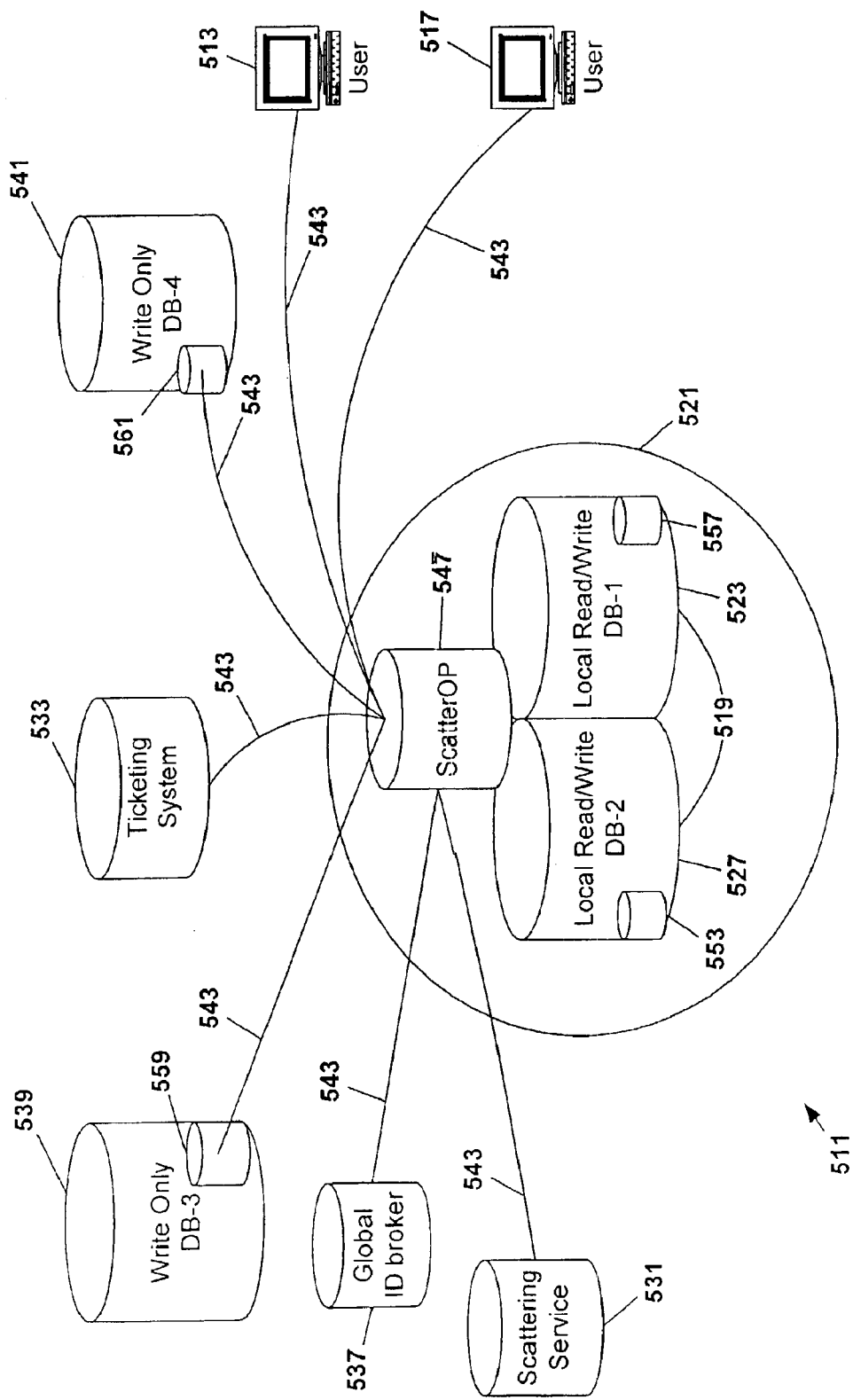
FIG. 6 is a simplified schematic illustration of the components comprising an alternate preferred embodiment of the present invention.

FIG. 6 is a depiction of a computer network environment 511 used to implement a described alternate preferred embodiment of a scattered database system of the present invention. In application, such alternate preferred embodiment of the present invention comprises a transparent middleware application that operates between the users 513 and 517 and the singular database 519 perceived by the client user to exist. In actuality, the alternate preferred embodiment provides multiple identical copies of the singular database 519, such as Local Read/Write Databases 523 and 527 and Write Only Databases 539 and 540, such that client user directives may be carried out in parallel upon separate, yet preferably substantially identical, instances of the singular database 519.

Preferably, existing as a network-based system, the components according to an alternate preferred embodiment of the present invention are preferably sub-grouped into two categories, components which must exist within the local area network 521, and those which may exist anywhere within the Internet, i.e., more specifically, they are part of the computer network environment 511 but are not required to be physically local components. The components which must exist within a local area network 521 are the Local Read/Write Databases 523 and 527, and the ScatterOp 547.

The system components, which may be located anywhere in the computer network environment 511, are preferably the Scattering Service 531, the Ticketing System 533, the Global ID Broker 537, and the Write Only Databases 539 and 541. Communication between the local system components and those that may exist outside of the local anywhere is preferably achieved by means of TCP/IP connections 543.

Since preferred embodiments of this invention exist essentially as transparent middleware, there are preferably no required modifications to be performed or required upon the application systems used by users 513 or 517. Preferably, users 513 or 517 engage their applications in a normal course of operation and are capable of performing database interaction utilizing TCP/IP connections 543 over the normal channels of the Internet. More specifically, the client user's interaction with the database is preferably permitted by a web-enabled database interface application the ScatterOp 547.

Preferably, when the application used by users 513 or 517 requires information from the database, the SQL statement is directed from the system of the users 513 or 517 to the present invention by means of TCP/IP connections 543, as would occur in normal database interaction.

Figure 7:
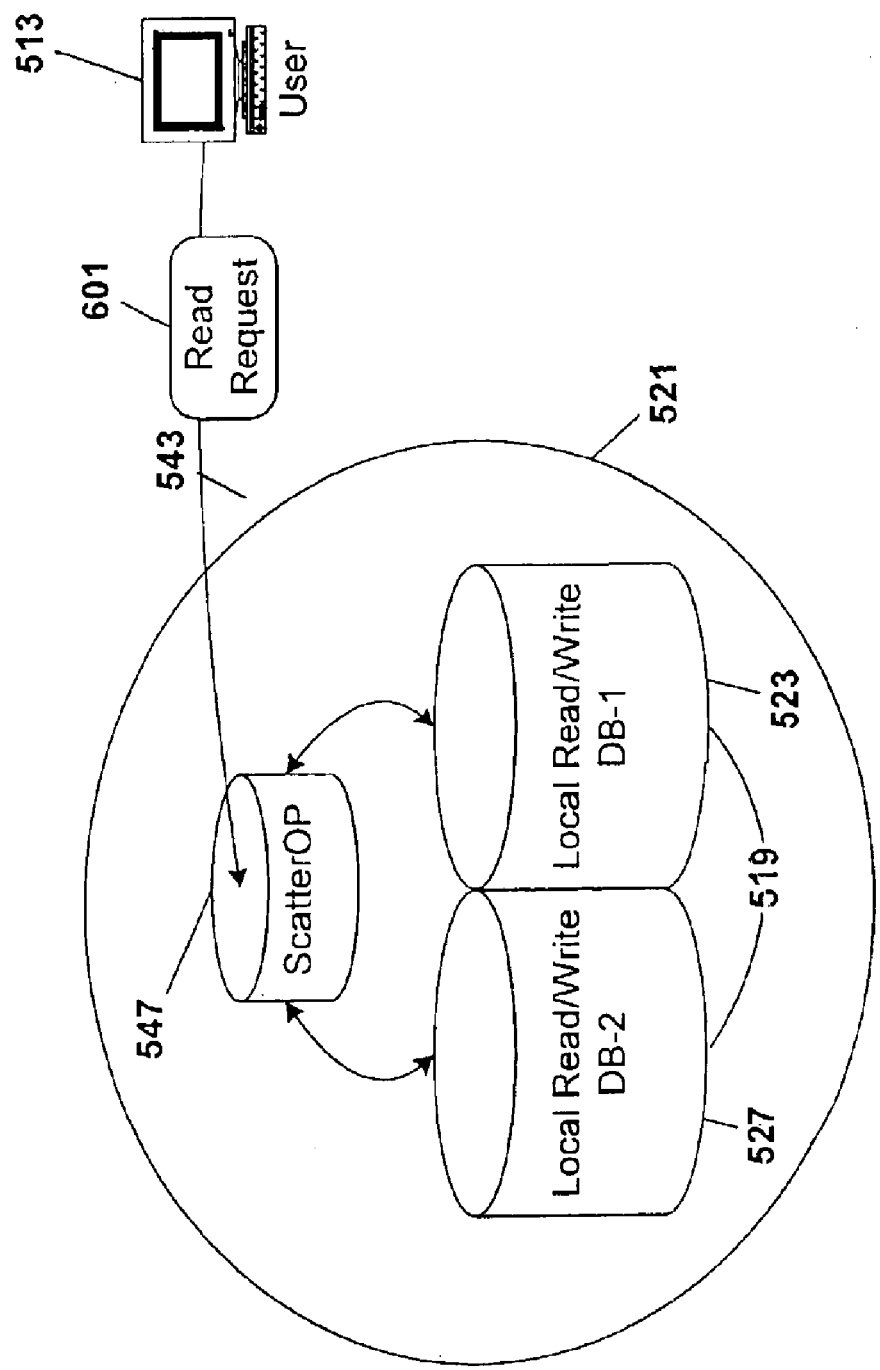
FIG. 7 is a simplified schematic illustration of the present invention responding to a user according to an alternate preferred embodiment.

FIG. 7 depicts a representation of the components of an alternate preferred embodiment of the present invention existing within the local area network 521, and, more specifically, of the initial behavior of the system in response to an https database command 601 by user 513. As shown in FIG. 7, establishing the preferred nature of the present invention, in response to the incoming https database command, in this case a Read Request 601, over a TCP/IP connection 543, a ScatterOp 547 is instantiated to interface with the user 513 during the course of his or her database interactions. Under appropriate circumstances, the incoming https requests, such as a Read Request 601, may be simply http. In either case, hereinafter either is understood as acceptable with respect to the phrase "web requests". It is understood that, as various database systems may employ different port settings for communication, the present invention preferably can be configured by the system administrator to respond to a user defined port setting. It is to be understood and appreciated that separate and substantially autonomous copies of ScatterOp 547 are instantiated for each separate connection request from a user 513. Preferably, the application server has been physically enabled with sufficient random access memory, one or more central processors, and sufficient system resources and connectivity bandwidth to accommodate an appropriate number of instances of ScatterOp 547, as may be appropriate for the given application of the present invention. Under appropriate circumstances, it may be considered under an alternate preferred embodiment of the present invention to enable a plurality of ScatterOps 547 serving in harmony to provide the database access resources desired by user 513. The distribution of incoming web requests among a plurality of physical web servers is well understood by those skilled in the art.

Users skilled in the art of Web-based information exchange will further recognize and appreciate that the ScatterOp 547 is preferably configured to respond to purposeful connection requests from user 513 and to otherwise preferably ignore non-purposeful connection requests. The received SQL statement is reviewed by the ScatterOp 547 for a determination of classification as a transactional or non-transactional request. Preferably, operations requiring actual modification to data maintained upon a database, such as an addition, deletion, or modification are classified as transactional. Preferably, operations requiring no modification to the data maintained upon the database are classified as non-transactional.

Non-transactional Operation

Figure 8:
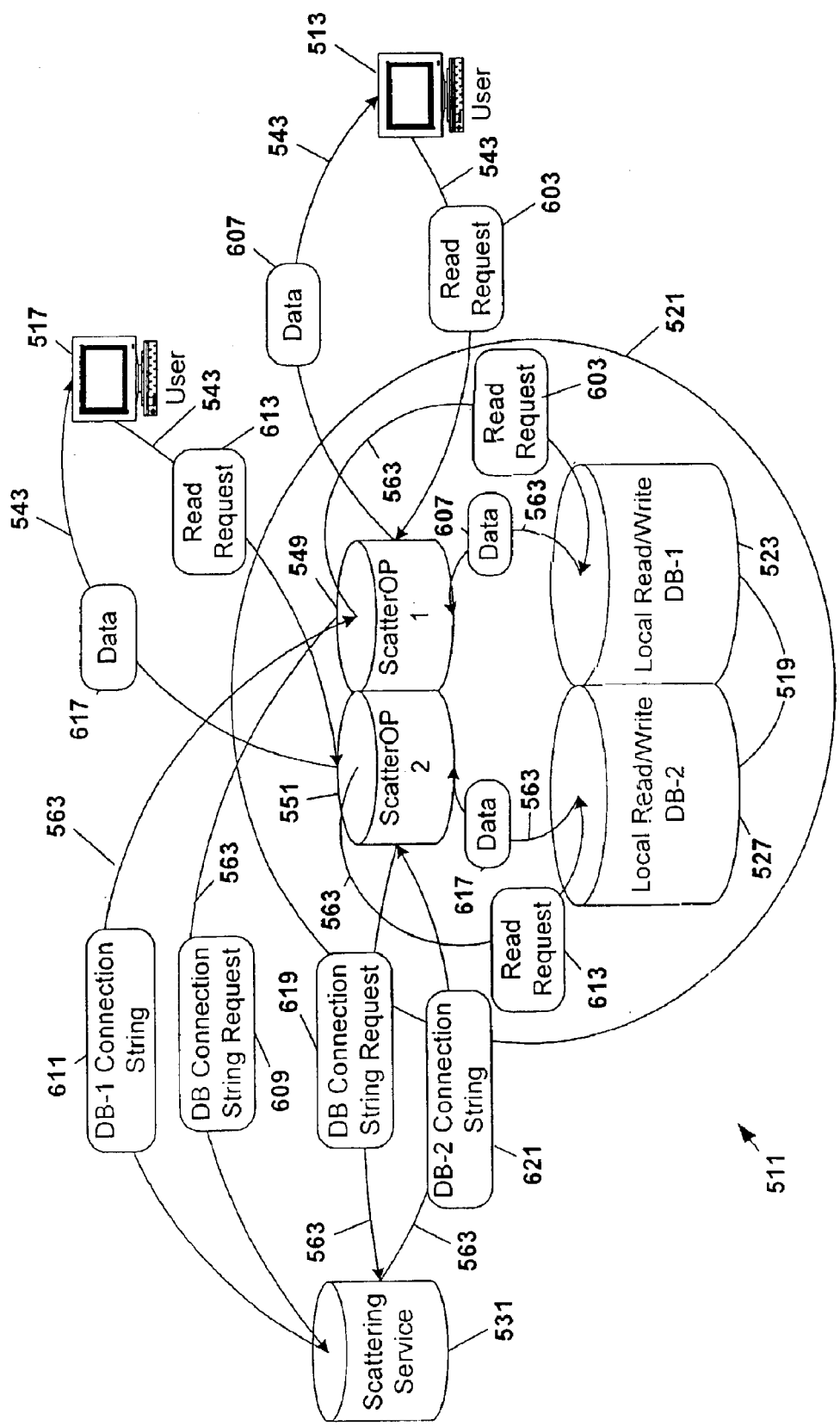
FIG. 8 is a simplified schematic illustration of the present invention processing a non-transactional query operation according to an alternate preferred embodiment.

FIG. 8 provides a flow diagram illustrating the connection paths and operation flow of a system operating under an alternate preferred embodiment of the present invention as it responds to two nearly simultaneous user requests to perform read queries upon the database. Prior to the development of the present invention, such simultaneous queries could not be performed upon the vast majority of common database systems.

User 513 transmits a Read Request 603 (a non-transactional database request) to the system 511 incorporating an alternate preferred embodiment of the present invention by means of https over a TCP/IP connection 543, as he or she would with a traditional network enabled database system. In response to the incoming Read Request 603 directed to the proper port, the ScatterOp 547 is instantiated. Upon a determination that the incoming Read Request 603 from a client user 513 is non-transactional, ScatterOp 547 initiates an https connection 563 to the Scattering Service 531 and sends a DB connection string request 609 for an available database 519. It is recognized that, under appropriate circumstances, http may be used in place of https; however, https is preferred as a more secure means of transferring data.

At substantially the same time, user 517 transmits a Read Request 613 (a non-transactional database request) to the system 511, incorporating an alternate preferred embodiment of the present invention by means of https over TCP/IP connection 543, as he or she would with a traditional network enabled database system. In response to the incoming Read Request 613 directed to the proper port, the ScatterOp 551 is instantiated. Upon a determination that the incoming request from client user 517 is non-transactional, ScatterOp 551 initiates an https connection 563 to the Scattering Service 531 and sends a DB connection string request 619 to an available database 519.

In this alternate preferred embodiment of the present invention, the Scattering Service 531 preferably provides connection strings in a traditional round robin fashion, wherein the first request is directed to system "n", the second request is sent to system "n+1." Subsequent requests will preferably continue to increment through the universe of available database systems until all have been assigned, at which time the cycle will reset and begin from the initial "n" database system. Preferably, under this alternate preferred embodiment of the present invention, the database systems provided for the non-transactional operations are from the universe of known and available Read/Write Databases. In such fashion, it is possible for the present invention to permit a multitude of users to query different records from different instances of the substantially identical database at substantially the same time.

In response to DB connection string request 609 from ScatterOp 549, the Scattering Service 531 returns the DB-1 connection string 611 for Local Read/Write Database 523. In response to the DB connection string request 619 from ScatterOp 551, the Scattering Service 531 increments according to the preferred "n+1" round robin methodology described above and returns the DB-2 connection string 621 for Local Read/Write Database 527. The DB-1 connection string 611 returned to the ScatterOp 549 by the Scattering Service 531 will preferably be arranged in XML and contain all the required information to locate and achieve a connection to the indicated Local Read/Write Database 523. Preferably, the DB-1 connection string 611 is inclusive of a domain name rather than a static IP address as the practice of resolving the domain name through a DNS provider permits near real time modification and redirections to be implemented without modifying data maintained by the Scattering Service 531.

Upon receipt of the DB-1 connection string 611, ScatterOp 549 will parse the string, according to the rules of XML grammar, and initiate an https connection 563 to the indicated Local Read/Write Database 523. Upon connection to Local Read/Write Database 523, ScatterOp 547 delivers the Read Request 603 provided by user 513. In accordance with the parameters governing Local Read/Write Database 523, the appropriate data records are located and the requested information 510 is returned to ScatterOp 547. In a substantially identical fashion, upon receipt of the connection string 621, ScatterOp 551 will parse the string, according to the rules of XML grammar, and initiate an https connection 563 to the indicated Local Read/Write Database 527. Upon connection to Local Read/Write Database 527, ScatterOp 551 delivers the Read Request 613 provided by user 517. In accordance with the parameters governing Local Read/Write Database 527, the appropriate data records are located and the requested data 617 is returned to ScatterOp 551.

Upon receipt of the requested data 607 and 617 from the Local Read/Write Databases 523 and 527, ScatterOps 549 and 551 return the requested data 607 and 617 to their respective client users 513 and 517, as if ScatterOps 549 and 551 themselves were the responding database. Upon confirmation of receipt of the requested data 607 and 617, the connections 543 between the ScatterOps 549 and 551 and client users 513 and 517 are closed, and ScatterOp instances 549 and 551 are terminated.

In such fashion, and with respect to FIG. 8, it can be appreciated that the illustrated an alternate preferred embodiment is capable of providing client user 513 with access to data records upon Local Read/Write Database 523 while client user 517 is provided with access to the data records upon Local Read/Write Database 527 in a substantially parallel process. As the data is maintained in physically different locations within a given instance of a database, such parallel access is significantly frustrated in database environments not employing the present invention.

Transactional Operation

Figure 9:
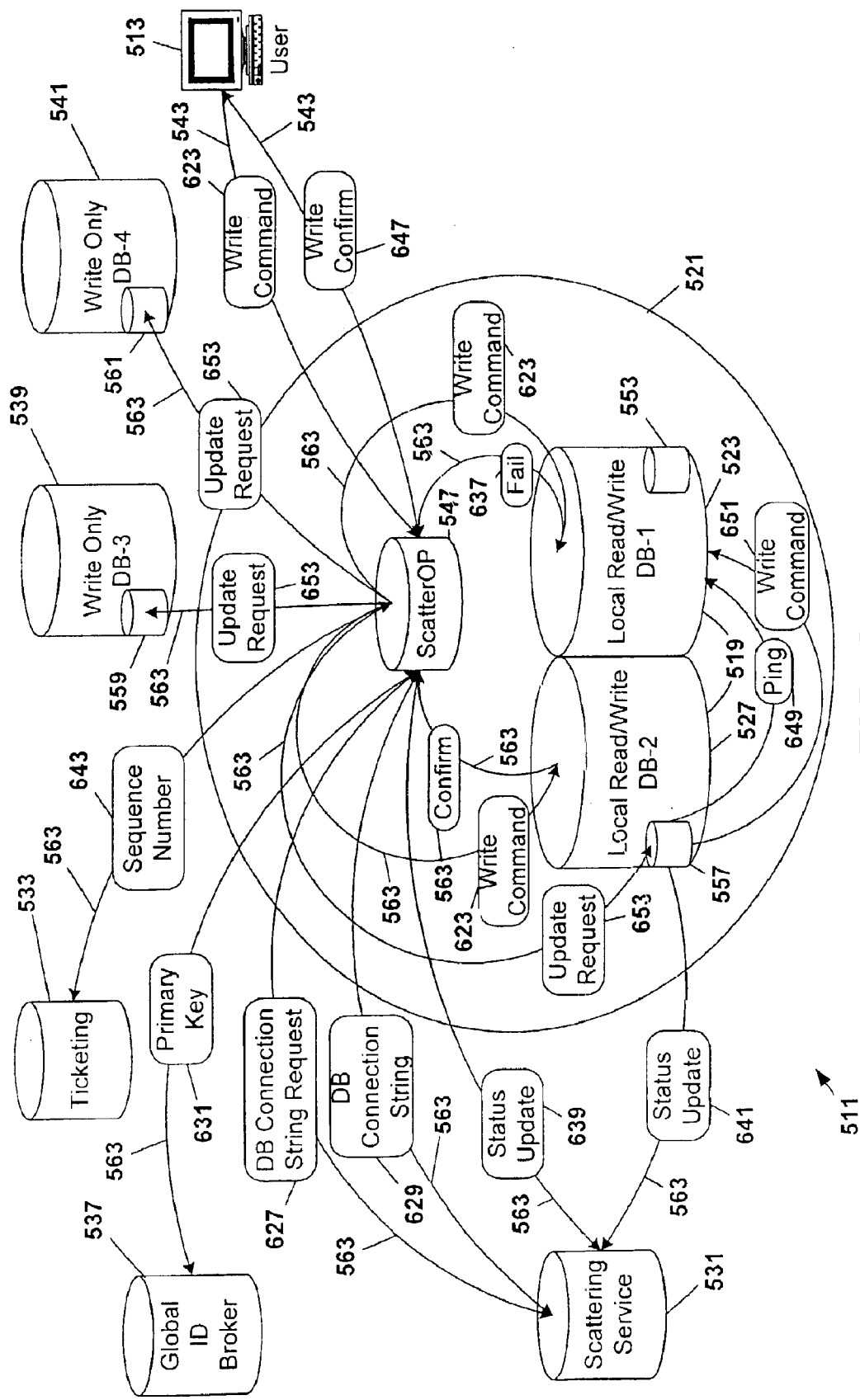
FIG. 9 is a simplified schematic illustration of the present invention processing a transactional query operation according to an alternate preferred embodiment.

FIG. 9 provides a flow diagram illustrating the connection paths and operation flow of a computer network environment 511 operating under an alternate preferred embodiment of the present invention as it responds to a transactional operation upon the database, for example, a write command. To maintain functionality of the multi-instance database under an alternate preferred embodiment of the present invention, it is necessary to perform the transactional operation upon all copies of the database.

User 513 transmits a Write Command 623 (a transactional database request), by means of https over a TCP/IP connection 543, as he or she would with a traditional network enabled database system. In response to the incoming Write Command 623 directed to the proper port, the ScatterOp 547 is instantiated. Upon a determination that the Write Command 623 from the client user 513 is transactional, ScatterOp 547 initiates an https connection 563 to the Scattering Service 531 and sends the Scattering Service 531 a DB Connection String Request 627 requesting an array of connection strings to all available databases 519. It is recognized that under appropriate circumstances, http may be used in place of https, however, https is preferred as a more secure means of transferring data.

Preferably, the DB connection string 629 for each Local Read/Write Database 523 and 527 is comprised of the host name for the Local Read/Write Database 523 and 527 as well as the host name for the associated Failed Queue 553 and 557. If a connection to Local Read/Write Database 527 is successful, the host name for the Failed Queue 557 is ignored. The DB connection string 629 for each Write Only Database 539 and 541 is preferably comprised of the host name of the associated Write Only Queue 559 and 561 and is singular in nature as failed queues are preferably not maintained as separate objects for each Write Only Database 539 and 541; rather, the Write-Only Queue 559 and 561 function as failed queues when and as necessary. Preferably, to minimize the connection time between ScatterOp 547 and Scattering Service 531, the DB connection string 629 are returned as an array.

With the DB connection strings 629 obtained, ScatterOp 547 further prepares for the execution of the transaction operation by obtaining a semaphore. Use of a semaphore permits ScatterOp 547 to synchronize the execution of the transaction dictated by the SQL statement among all Local Read/Write Databases 523 and 527. Semaphore synchronization is preferred, for if synchronization is not maintained among all copies, the transparent nature of the separate instances of the database each being perceived by the end client user as the same database will fail. Further, because a transaction operation must be performed across all copies of the Read/Write Databases 523 and 527 before further operations are performed, it is preferred that synchronization be achieved in the most time efficient manner possible. Semaphore synchronization practice has proven most effective for applications of this type and therefore is the preferred method of synchronization. In smaller systems, it may be desired by the system administrator to locate the semaphore generator within the system supporting the Scattering Server, thus avoiding the cost and physical space requirements of maintaining a separate system. Under appropriate circumstances, such as a large database system with a substantial volume of user connections, the resource requirements of the ScatterOps 547 may be such that it is preferred to centralize the semaphore generation entity upon a dedicated separate web server incorporated as a specifically identifiable entity within the present invention.

Additionally, preferably, when and as necessary to properly execute the transactional operation, the ScatterOp 547 will obtain the requisite Primary Key 631 from the Global ID Broker 537. For purposes of the example shown, it is to be presumed that the write command 623 desired by user 513 is a write of new data to the database, thus identical identification of the new record across all peer copies is necessary. To achieve homogeneous identification, ScatterOp 547 establishes an https connection 563 to Global ID Broker 537. In response to the connection and request, Global ID Broker 537 returns a proper Primary Key 631 to ScatterOp 547.

Preferably, the ScatterOp 547 instantiates multiple threads establishing connections 563 and 563 to Local Read/Write Databases 523 and 527 respectively, as indicated by the preference of host names provided by the Scattering Service 531. Proper handshaking confirms the connection and the write command 623 is provided by ScatterOp 547 to each Local Read/Write Database 523 and 527. In accordance with proper database policies and procedures as required by the underlying database to which the present invention is applied, the write command 623 is appropriately committed as evidenced by a confirm 633 sent back to ScatterOp 547 or rolled back by each Local Read/Write Database 523 and 527 as evidenced by fail 637 sent to ScatterOp 547 by Local Read/Write Database 523.

Upon successful commitment of the write command 623 to the functional Local Read/Write Database 527, the ScatterOp 547 prepares to direct the write command 623 to the known Failed Queues 553 and 557 and Write-Only Queues 559 and 561. In the event that Local Read/Write Database 523 failed to properly connect or confirm commitment, the Failed Queue 557 for such apparently failing Local Read/Write Database 523 will also be included in the next round of SQL statement marshaling.

As shown in FIG. 9, connection 563 from ScatterOp 547 to Local Read/Write Database 527 was successful, and as a result of proper commitment of the SQL command, a confirmation Confirm 633 is returned to ScatterOp 547. Connection 563 from ScatterOp 547 to Local Read/Write Database 523 was either unsuccessful, or the attempted commitment of the SQL command was a failure. In either case, the lack of a successful confirmation is recognized as a fail 637.

In response to the indication of fail 637, ScatterOp 547 adjusts to include the Failed Queue 557 for Local Read/Write Database 523 in the next phase of operation. The connection string for the Failed Queue 553 of Local Read/Write Database 527 is disregarded as the write operation was successfully completed. ScatterOp 547 will also establish a connection 563 to Scattering Service 531 and send a status update 639 to inform Scattering Service 531 that the Local Read/Write Database 523 is down and transactional commands are being rerouted to the associated Failed Queue 557. Informing the Scattering Service 531 is preferable so as to remove the apparently failing Local Read/Write Database 523 from participating in future non-transactional operations.

Due to the nature of packet transmission over the Internet, it is to be expected that, from time to time, packets will arrive at their destination in an order quite different from the order in which they were sent. Proper structure of each instance of the database requires that all transactional operations occur in the precise order intended by the client users of the database system.

Preferably, to achieve synchronous operation of transactional operations without undue concern to the delays in packet delivery, an alternate preferred embodiment of the present invention incorporates a Ticketing System 533. The ScatterOp 547 establishes an https connection 563 to the Ticketing System 533 and obtains a unique and preferably time based sequence number 643 from the Ticketing System 533. In accordance with XML grammar, ScatterOp 547 attaches the sequence number 643 to the Write Command 623 provided by user 517.

With the sequence number 643 now in place, ScatterOp 547 initiates the process, preferably by instantiating multiple https connections 563 to connect to each Write-Only Queue 559 and 561 and Failed Queue 557 as specified by the Scattering Service 531 or reverted to upon failure by the ScatterOp 547 to connect or confirm execution in the initial round to a specified Local Read/Write Database 523. The preferred behavior for establishing multiple https connections 563 substantially simultaneously may, under appropriate circumstances, be performed in an arbitrary or round robin style of succession. Substantially simultaneous https connections 563 are preferred, for upon completion of all tasks the instance of the ScatterOp 547 performing the operation may be terminated and the memory resources reallocated. Because Write-Only Database 539 and 541 and Failed Queues 553 and 557 are not subject to read operations under the present invention, it is unnecessary to implement semaphore usage to insure proper synchronization. More specifically, substantially simultaneous synchronization is not required and the sequence value placed upon the SQL statement is sufficient to ensure that the statements are written into each specific instance of the database 519 in the proper order from the XML queue (Failed or Write Only) in which they are recorded.

Preferably, upon successful confirmation or rollback of the SQL statement upon the Local Read/Write Databases 523 and 527, the ScatterOp 547 will send Write Confirm 647 to client user 513 that the Write Command 623 is complete. In accordance with traditional TCP/IP procedures, the connection between the ScatterOp 547 and client user 513 will then be closed. The ScatterOp 547 instance will continue in operation until such time as it has completed marshaling the Write Command 623 to all Write-Only Queues 559 and 561 and Failed Queues 553 and 557.

Preferably, ScatterOp 547 will send the Update Request 653 which contains the sequence number 643 and the Write Command 623 to the Write-Only Queues 559 and 561 and Failed Queues 557. In the event that a Write-Only Queue 559 or 561 or Failed Queue 553 or 557 fails to confirm receipt and storage of the Update Request 653, ScatterOp 547 will inform the Scattering Service 531 that the respective Write-Only Queue 559 or 561 or Failed Queue 553 or 557 is out of sync and should be noted as off line and not eligible to receive any future transactional commands. Restructure by a database administrator is then required to return the failed component to operational status.

The operation of the Write-Only Queue 559 and 561 is preferably quite simple. Each SQL statement is received by Write-Only Queues 559 and 561 as transmitted by ScatterOp 547 and placed in an XML queue for writing to the associated Write-Only Database 541 and 539. As system resources permit, Write-Only Database 541 and 539 draw from their associated Write-Only Queues 559 and 561 the XLM commands and commit them accordingly. Should the Write-Only Database 541 or 539 fail, the Write-Only Queue 559 and 561 will continue to store incoming SQL statements in the XML queue until such time as the Write-Only Database 541 or 539 returns to life or the queue is filled. Preferably, the Write-Only Queue 559 and 561 is configured such that statements are automatically fed from the Write-Only Queue 559 and 561 to the Write-Only Database 541 or 539 when it is available.

The operation of the Failed Queue 557 is akin to the Write-Only Queue; however, it is a preferred requirement under this alternate embodiment of the present invention that the Failed Queue 557 be physically separate from the Local Read/Write Database application 523 with which it corresponds. As shown, the Failed Queue 557 for Local Read/Write Database application 523 is physically located within the system environment supporting Local Read/Write Database application 527. The choice of local locations for the Failed Queue 557 is a matter of system administration preference.

To identify the return or activation of the Local Read/Write Database 523, the Failed Queue 557 employs a simple iterative operation akin to the network diagnostic tool "ping"

649. Preferably, as the present invention requires not only that the Read/Write Database hardware system be functional, but additionally that the Local Read/Write Database 523 itself be operational, the "ping" 649 performed by Failed Queue 557 is capable of determining both the presence of the hardware system and the operation status of the Local Read/Write Database 523. Upon a receiving a response to "ping" 649 that Local Read/Write Database application 523 is ready to participate in the processing of commands, Failed Queue 557 sends write commands 651 containing the queued XML commands to Local Read/Write Database 523. Upon a successful complete transfer of all SQL statements from the XML queue of Failed Queue 557, the Failed Queue 557 will preferably send a Status Update 641 to inform the Scattering Service 531 by https communication 563 that Local Read/Write Database 523 has returned to operational health and is ready to participate in processing non-transactional queries. Scattering Service 531, accordingly and preferably adjusts its record set for the status of the system incorporating the present invention so as to provide Local Read/Write Database 523 to future requests for non-transactional operations and to indicate Local Read/Write Database 523 itself as the preferred primary target for transactional operations, with the Failed Queue 557 serving as backup.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from each and every novel detail, feature, article, process, system and/or method disclosed in or mentioned by or shown in this specification, including the drawings, the claims, the abstract, and any appendices.

What is claimed is:

1. A computer system for use in providing load balancing and scalable access to at least two first database replicated instances in a networked environment comprising a plurality of such first replicated database instances, available to a population of users, comprising:
    a) at least one first computer processor structured and arranged to perform record retrieval essentially simultaneously from each of such at least two first database replicated instances;
    b) at least one second computer processor structured and arranged to control processing of at least one update request onto each of such at least two first database replicated instances
    c) at least one third computer processor structured and arranged to assign at least one unique identifier for each unique record in such at least two first database replicated instances;
    d) at least one second database structured and arranged to store such at least one unique identifier;
    e) at least one third database structured and arranged to store at least one copy of each such update request;
    f) at least one fourth database structured and arranged to store location information for each at least two first database replicated instances used for record retrieval; and
    g) wherein such at least one first computer processor is further structured and arranged to randomly select at least one such instance of such at least two first database replicated instances from such at least one fourth database.

2. The computer system according to claim 1 further comprising:
    a) at least one fifth database structured and arranged to store location information for each at least two first database replicated instances to be updated; and
    b) at least one fourth computer processor structured and arranged to restore at least one instance of at least two first database replicated instances not substantially identical to all other such instances of at least two first database replicated instances to substantial identicalness with all other such instances of such at least two first database replicated instances.

3. The computer system according to claim 2 wherein such at least one first computer processor is further structured and arranged to:
    a) replicate itself automatically for each of at least two operating end-user computer processor systems; and
    b) permit each copy of such at least one first computer processor for each of such at least two end-user computer processing systems direct communication with such at least one first database replicated instance.

4. The computer system according to claim 2 wherein such at least one first computer processor is further structured and arranged to:
    a) receive at least one database request form at least one end-user computer processor system;
    b) determine the nature of such at least one database request;
    c) retrieve at least one requested record from at least one instance of such at least two first database replicated instances;
    d) transmit such at least one retrieved requested record to the at least one end-user computer processor system;
    e) transmit such at least one update request to such at least one second computer processor structured and arranged to control processing of at least one update request onto each of such at least two first database replicated instances; and
    f) transmit update outcome information to the at least one end-user computer processor system.

5. The computer system according to claim 2 wherein such first computer processor is further structured and arranged to:
    b) update such at least one fourth database when at least one such instance of such at least two first database replicated instances is non-responsive to retrieval requests by such at least one second computer processor; and
    c) randomly select at least one such instance of such at least two first database replicated instances from such at least one fourth database when at least one such instance of such at least two first database replicated instances is non-responsive to retrieval requests by such at least one second computer processor.

6. The computer system according to claim 2 wherein such at least one second computer processor is further structured and arranged to:
    a) receive such at least one update request from such at least one first computer processor;
    b) insert at least one copy of such at least one update request onto such at least one third database;
    c) retrieve such location information for at least one such instance of such at least two first database replicated instances from such at least one fifth database;

d) transmit at least one such update request to each such instance of such at least two first database replicated instances using such location information;

e) receive such update outcome information for each such update request transmitted to each such instance of such at least two first database replicated instances;

f) add such update outcome information to such at least one copy of such at least one update request on such at least one third database;

g) recognize failure of such at least one instance of such at least two first database replicated instances to accept at least one such update request;

h) transmit such update outcome information to such at least one first computer processor; and i) initiate such at least one fourth computer processor.

7. The computer system according to claim 3 wherein such at least one fourth computer processor is further structured and arranged to:

a) test presence of such at least one instance of at least two first database replicated instances not substantially identical to all other such instances of at least two first database replicated instances;

b) test readiness of such at least one instance of at least two first database replicated instances not substantially identical to all other such instances of at least two first database replicated instances to accept update requests;

c) retrieve at least one unprocessed update request for such at least one instance of at least two first database replicated instances not substantially identical to all other such instances of such at least two first database replicated instances from such at least one third database;

d) transmit at least one unprocessed such update request to such at least one instance of at least two first database replicated instances not substantially identical to all other such instances of such at least two first database replicated instances;

e) receive such update outcome information for each unprocessed such update request transmitted to each such instance of such at least two first database replicated instances not substantially identical to all other such instances of such at least two first database replicated instances;

f) add such update outcome information to each such update request on such at least one third database;

g) manage transmission of all such unprocessed update requests until completion; and h) transmit completion progress information to such at least one second computer processor.

8. The computer system according to claim 7 wherein such second computer processor is further structured and arranged to:

a) receive such completion progress information from such fourth computer processor;

b) suspend receiving such at least one update request from such at least one first computer processor when such completion progress information reaches a preset value;

c) resume receiving such at least one update request from such at least one first computer processor when such completion progress indicates all unprocessed such updates have been applied; and d) transmit notification that such at least one such instance of such at least two first database replicated instances is substantially identical to all other such instances of such at least two first database replicated instances to at least one such first computer processor.

9. A computer software program, for use in providing load balancing and scalable access to at least two first database replicated instances in a networked environment comprising a plurality of such first replicated database instances, available to a population of users, comprising the step(s) of:

a) performing record retrieval essentially simultaneously from each of such at least two first database replicated instances;

b) controlling processing of at least one update request onto each of such at least two first database replicated instances;

c) assigning at least one unique identifier for each unique record in such at least two first database replicated instances;

d) storing such at least one unique identifier;

e) storing at least one copy of each such update request;

f) storing location information for each such at least two first database replicated instances used for record retrieval in at least one fourth database; and g) randomly selecting at least one such instance of such at least two first database replicated instances used for record retrieval from such at least one fourth database.

10. The computer software program according to claim 9 further comprising the step(s) of:

a) storing location information for each such at least two first database replicated instances to be updated; and b) restoring at least one instance of such at least two first database replicated instances not substantially identical to all other such instances of at least two first database replicated instances to substantial identicalness with all other such instances of such at least two first database replicated instances.

11. The computer software program according to claim 10 further comprising the steps of:

a) receiving at least one database request from at least one end-user computer processor system;

b) determining the nature of such at least one database request;

c) retrieving at least one requested record from at least one instance of such at least two first database replicated instances;

d) transmitting such at least one retrieved requested record to the at least one end-user computer processor system; and e) transmitting update outcome information to the at least one end-user computer processor system.

12. The computer software program according to claim 10 further comprising the steps of:

b) updating such at least one fourth database when at least one such instance of such at least two first database replicated instances is non-responsive to retrieval requests; and c) randomly selecting at least one such instance of such at least two first database replicated instances from such at least one fourth database when at least one such instance of such at least two first database replicated instances is non-responsive to retrieval requests.

13. The computer software program according to claim 10 further comprising the steps of:

a) inserting at least one copy of such at least one update request onto such at least one third database;

b) retrieving such location information for at least one such instance of such at least two first database replicated instances from such at least one fifth database;

c) transmitting at least one such update request to each such instance of such at least two first database replicated instances using such location information;

d) receiving such update outcome information for each such update request transmitted to each such instance of such at least two first database replicated instances;

e) adding such update outcome information to such at least one copy of such at least one update request on such at least one third database; and f) recognizing failure of such at least one instance of such at least two first database replicated instances to accept at least one such update request.

14. The computer software program according to claim 1 further comprising the steps of:

a) testing for presence of such at least one instance of such at least two first database replicated instances not substantially identical to all other such instances of such at least two first database replicated instances;

b) testing for readiness of such at least one instance of such at least two first database replicated instances not substantially identical to all other such instances of such at least two first database replicated instances to accept update requests;

c) retrieving at least one unprocessed update request for such at least one instance of such at least two first database replicated instances not substantially identical to all other such instances of such at least two first database replicated instances from such at least one third database;

d) transmitting at least one unprocessed such update request to such at least one instance of such at least two first database replicated instances not substantially identical to all other such instances of such at least two first database replicated instances;

e) receiving such update outcome information for each unprocessed such update request transmitted to each such instance of such at least two first database replicated instances not substantially identical to all other such instances of such at least two first database replicated instances;

f) adding such update outcome information to each such update request on such at least one third database; and g) managing transmission of all such unprocessed update requests until completion.

15. The computer software program according to claim 14 further comprising the steps of:

a) suspending receiving such at least one update request when such completion progress information reaches at least one preset value; and b) resuming receiving such at least one update request when such completion progress indicates all unprocessed such updates have been processed.

16. A software method, for network database environments, permitting load balancing, scalability and substantially simultaneous use by client users, comprising the steps of:

a) providing multiple database instances wherein each such instance is substantially identical in data content, database structure, and primary key system;

b) maintaining substantially real time records of status for each such multiple database instance;

c) receiving a database query from at least one end-user application and determining such query to be a transactional query or non-transactional query;

d) directing such database query to at least one selected instance of such multiple database instances upon a determination of such query being a non-transactional query;

e) returning such non-transactional query results to the at least one end-user application;

f) directing such database query to all instances of such multiple database instances upon a determination of such query being a transactional query;

g) controlling such transactional queries to maintain substantial identicalness among such multiple database instances;

h) propagating such transactional queries to such multiple database instances;

i) returning such query results to the user;

j) recognizing a failure in at least one instance of such multiple database instances, and adjusting to store such transactional query for later propagation;

k) restoring such failed at least one instance of such multiple database instances to substantial identicalness with other such multiple database instances.

17. The method according to claim 16 wherein each such non-transactional query is executed upon a randomly selected instance of such multiple database instances.

18. The method according to claim 16 wherein the processing of such non-transactional query commands as directed by a plurality of users is substantially simultaneous.

19. A business system, for network database environments, permitting load balancing, scalability and substantially simultaneous use by client users, comprising the steps of:

a) providing multiple database instances wherein each such instance is substantially identical in data content, database structure, and primary key system;

b) providing a middleware software management to directly manage access to such multiple instances of the database, wherein such middleware software management performs the steps of;

i) establishing a single source for maintaining substantially real time records of status for such multiple database instances;

ii) providing a plurality of interface instances to receive a database query from at least one user, iii) determining such query to be a transactional query or non-transactional query;

iv) directing such non-transactional query to an available instance of such multiple database instances determined to be available by such real time records of status;

v) directing such transactional query to all available instances of such multiple database instances determined to be available by such real time records of status;

vi) returning such query results to the user.

20. A business method according to claim 19 wherein the processes of such middleware software management and existence of such multiple instances of the database are transparent to the user, the user perceiving only a single, ultra responsive database.

* * * * *

UNITED STATES PATENT AND TRADEMARK OFFICE
CERTIFICATE OF CORRECTION

PATENT NO. : 6,898,609 B2
DATED : May 24, 2005
INVENTOR(S) : Kerwin, Douglas W.

It is certified that error appears in the above-identified patent and that said Letters Patent is hereby corrected as shown below:

Column 52,
Line 27, "form" should read -- from --
Line 46, "b)" should read -- a) --
Line 51, "c)" should read -- b) --

Signed and Sealed this

Ninth Day of August, 2005

JON W. DUDAS
*Director of the United States Patent and Trademark Office*